(12) United States Patent
Zhao et al.

(10) Patent No.: US 10,893,286 B2
(45) Date of Patent: Jan. 12, 2021

(54) METHODS AND APPARATUS FOR LOW-COMPLEXITY MTS

(71) Applicant: TENCENT AMERICA LLC, Palo Alto, CA (US)

(72) Inventors: Xin Zhao, Palo Alto, CA (US); Xiang Li, Los Gatos, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/535,276

(22) Filed: Aug. 8, 2019

(65) Prior Publication Data

US 2020/0112734 A1     Apr. 9, 2020

Related U.S. Application Data

(60) Provisional application No. 62/785,679, filed on Dec. 27, 2018, provisional application No. 62/749,494, filed on Oct. 23, 2018, provisional application No. 62/743,536, filed on Oct. 9, 2018.

(51) Int. Cl.
| | | |
|---|---|---|
| *H04N 19/44* | (2014.01) | |
| *H04N 19/625* | (2014.01) | |
| *H04N 19/176* | (2014.01) | |
| *H04N 19/119* | (2014.01) | |
| *H04N 19/186* | (2014.01) | |
| *H04N 19/96* | (2014.01) | |

(52) U.S. Cl.
CPC ........... *H04N 19/44* (2014.11); *H04N 19/119* (2014.11); *H04N 19/176* (2014.11); *H04N 19/186* (2014.11); *H04N 19/625* (2014.11); *H04N 19/96* (2014.11)

(58) Field of Classification Search
CPC .... H04N 19/44; H04N 19/625; H04N 19/176; H04N 19/119; H04N 19/186; H04N 19/96; H04N 19/167; H04N 19/122; H04N 19/159; H04N 19/61; H04N 19/50; H04N 19/91
See application file for complete search history.

(56) References Cited

U.S. PATENT DOCUMENTS 10,334,257 B2 * 6/2019 Oh .................. H04N 19/59
10,356,413 B1 * 7/2019 Sim ................. H04N 19/44
(Continued)

*Primary Examiner* — James M Pontius
(74) *Attorney, Agent, or Firm* — Sughrue Mion, PLLC

(57) ABSTRACT

A next-generation video decoding technique performed by at least one computer processor including determining whether at least one parameter of a block is less than or equal to a threshold, signaling, in response to determining the parameter(s) of the block is/are less than or equal to the threshold, a horizontal transform or vertical transform, splitting, in response to determining that the at least one parameter of the block is greater than the threshold, the block into sub-blocks, applying a first signaling scheme on a luma component and a second signaling scheme on a chroma component, performing ones of transforms on the sub-blocks, and decoding a video stream by using the sub-blocks upon which the ones of the transforms are performed, where a maximum block size of the first signaling scheme is different than a maximum block size of the second signaling scheme.

20 Claims, 14 Drawing Sheets

(56) References Cited

U.S. PATENT DOCUMENTS

| | | | | |
|---|---|---|---|---|
| 2013/0016788 | A1* | 1/2013 | Oh | H04N 19/44 |
| | | | | 375/240.16 |
| 2013/0034159 | A1* | 2/2013 | Siekmann | H04N 19/44 |
| | | | | 375/240.12 |
| 2014/0314142 | A1* | 10/2014 | Oh | H04N 19/186 |
| | | | | 375/240.02 |
| 2016/0381383 | A1* | 12/2016 | Oh | H04N 19/107 |
| | | | | 375/240.16 |
| 2018/0109793 | A1* | 4/2018 | Tsai | H04N 19/122 |
| 2018/0332289 | A1* | 11/2018 | Huang | H04N 19/186 |
| 2019/0335172 | A1* | 10/2019 | Zhao | H04N 19/119 |
| 2020/0053363 | A1* | 2/2020 | Min | H04N 19/44 |
| 2020/0092546 | A1* | 3/2020 | Ye | H04N 19/105 |
| 2020/0099924 | A1* | 3/2020 | Seregin | H04N 19/103 |
| 2020/0137398 | A1* | 4/2020 | Zhao | H04N 19/137 |
| 2020/0186838 | A1* | 6/2020 | Zhao | H04N 19/132 |
| 2020/0244956 | A1* | 7/2020 | Lee | H04N 19/105 |
| 2020/0244968 | A1* | 7/2020 | Jun | H04N 19/176 |
| 2020/0252608 | A1* | 8/2020 | Ramasubramonian | H04N 19/176 |
| 2020/0260078 | A1* | 8/2020 | Zhao | H04N 19/625 |
| 2020/0260097 | A1* | 8/2020 | Zhao | H04N 19/48 |

* cited by examiner

FIG. 5
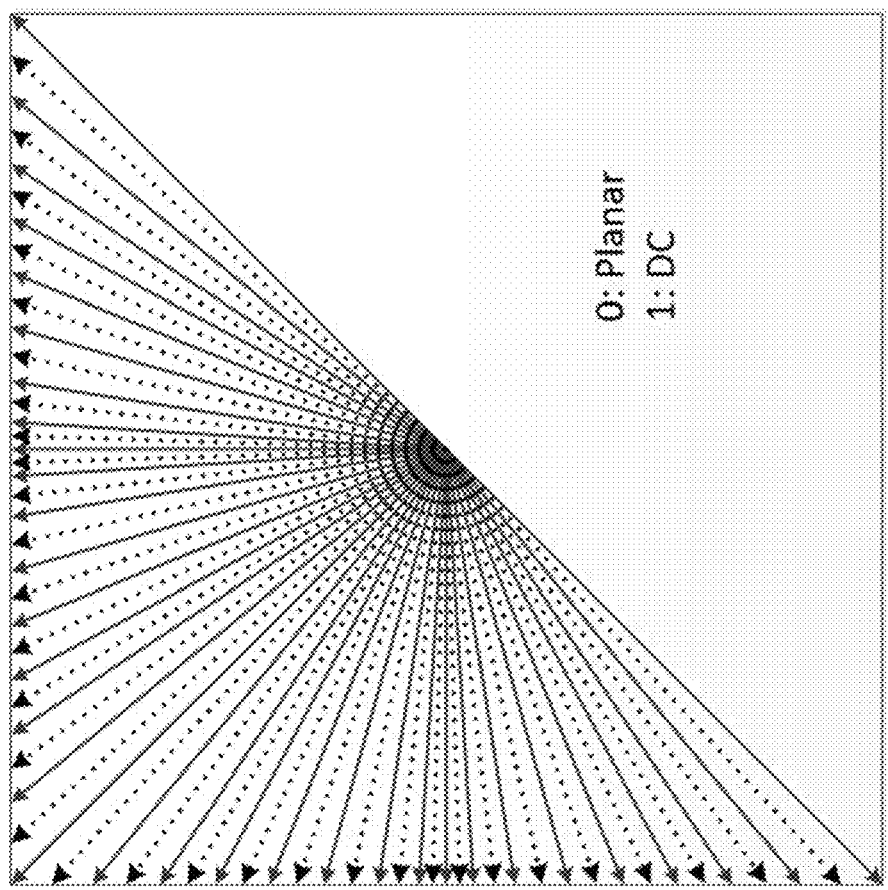
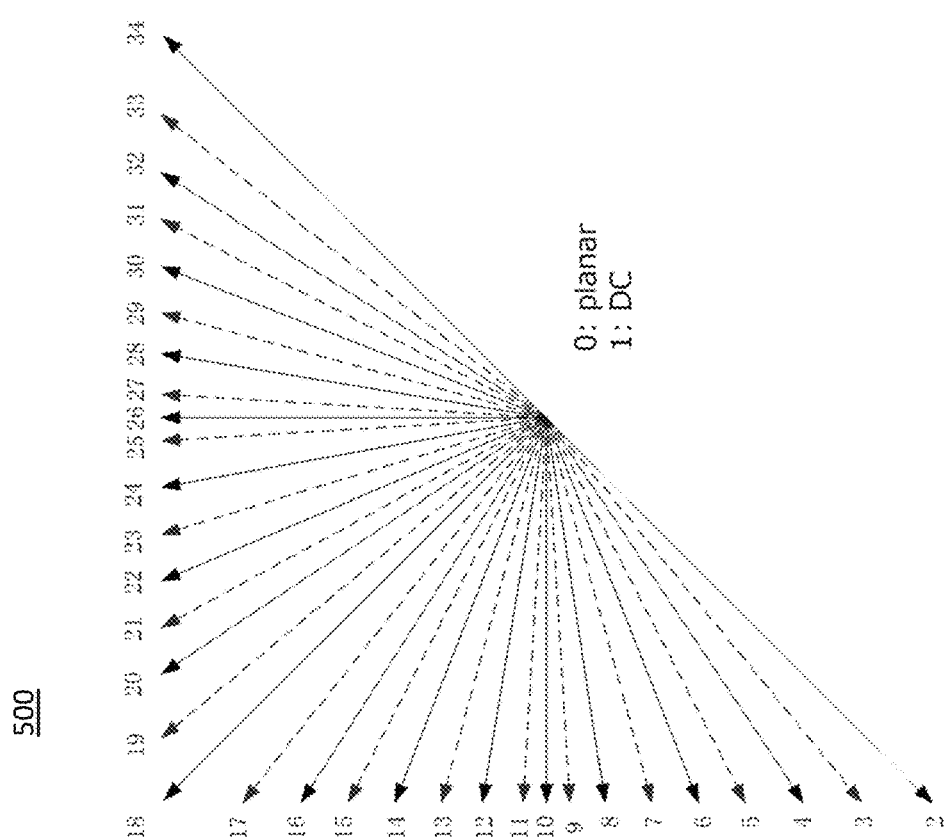

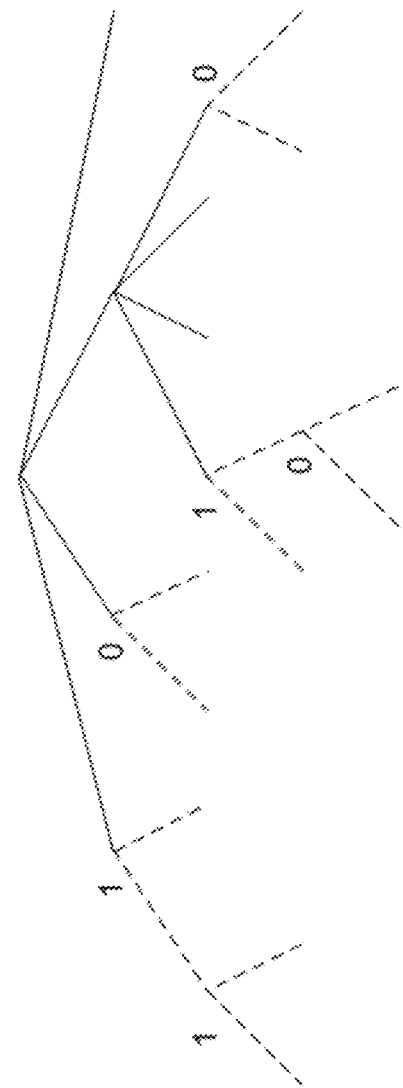
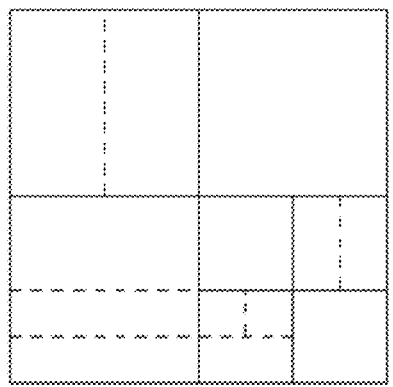
Fig.9B
901
Fig.9A
900

METHODS AND APPARATUS FOR LOW-COMPLEXITY MTS

CROSS REFERENCE TO RELATED APPLICATION

The present application claims priority from U.S. provisional applications: U.S. 62/743,536 filed Oct. 9, 2018, U.S. 62/749,494 filed Oct. 23, 2018, and U.S. 62/785,679 filed Dec. 27, 2018. Each of the above applications is hereby expressly incorporated by reference, in its entirety, into the present application.

BACKGROUND

1. Field

The present disclosure is directed to next-generation video coding technologies beyond High Efficiency Video Coding (HEVC), e.g., Versatile Video Coding (VVC), and more specifically to advanced video coding technologies such as simplifying multiple transform selection (MTS) with a transform scheme for chroma component and intra-inter prediction mode for example.

2. Description of Related Art

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). In 2015, these two standard organizations jointly formed the Joint Video Exploration Team (JVET) to explore the potential of developing the next video coding standard beyond HEVC. In October 2017, they issued the Joint Call for Proposals on Video Compression with Capability beyond HEVC (CfP). By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET meeting. As a result of this meeting, JVET formally launched the standardization process of next-generation video coding beyond HEVC. The new standard was named Versatile Video Coding (VVC), and JVET was renamed as Joint Video Expert Team. A version of VVC Test Model (VTM) is VTM 3.

In HEVC, a coding tree unit (CTU) is split into coding units (CUs) by using a quadtree structure denoted as coding tree to adapt to various local characteristics. The decision whether to code a picture area using inter-picture (temporal) or intra-picture (spatial) prediction is made at the CU level. Each CU can be further split into one, two or four prediction units (PUs) according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One of key feature of the HEVC structure is that it has the multiple partition conceptions including CU, PU, and TU. In HEVC, a CU or a transform unit (TU) can only be square shape, while a PU may be square or rectangular shape for an inter predicted block. In later stage of HEVC, it was proposed to allow rectangular shape PUs for intra prediction and transform. These proposals were not adopted to HEVC but extended to be used in a Joint Exploration test Model software (JEM). At picture boundary, HEVC imposes implicit quad-tree split so that a block will keep quad-tree splitting until the size fits the picture boundary.

In HEVC, a CTU is split into CUs by using a quadtree structure denoted as coding tree to adapt to various local characteristics. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One of key feature of the HEVC structure is that it has the multiple partition conceptions including CU, PU, and TU.

In HEVC, inter prediction for small blocks is restricted to reduce the memory access of motion compensation, such that bi-prediction is not supported for 4×8 and 8×4 blocks, and inter prediction is not supported for 4×4 blocks. In the Quad Tree plus Binary Tree (QTBT) of the JEM, these restrictions are removed.

In addition to DCT-II (a discrete cosine transform (DCT)) and 4×4 DST-VII (a discrete sine transform (DST)) which have been employed in HEVC, an Multiple Transform Selection (MTS, or as known as Adaptive Multiple Transform (AMT), or as known as Enhanced Multiple Transform (EMT)) scheme is used for residual coding for both inter and intra coded blocks. It uses multiple selected transforms from the DCT/DST families other than the current transforms in HEVC. The newly introduced transform matrices are DST-VII, DCT-VIII, DST-I and DCT-V. Table 1 below shows basis functions of the selected DST/DCT.

TABLE 1

Transform basis functions of DCT-II/V/VIII and DST-I/VII for N-point input

| Transform Type | Basis function $T_i(j)$, $i, j = 0, 1, \ldots, N-1$ |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$ where $\omega_0 = \begin{cases} \sqrt{\frac{2}{n}} & i=0 \\ 1 & i \neq 0 \end{cases}$ |
| DCT-V | $T_i(j) = \omega_0 \cdot \omega_1 \cdot \sqrt{\frac{2}{2N-1}} \cdot \cos\left(\frac{2\pi \cdot i \cdot j}{2N-1}\right)$, where $\omega_0 = \begin{cases} \sqrt{\frac{2}{N}} & i=0 \\ 1 & i \neq 0 \end{cases}$, $\omega_1 = \begin{cases} \sqrt{\frac{2}{N}} & j=0 \\ 1 & j \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-I | $T_i(j) = \sqrt{\frac{2}{N+1}} \cdot \sin\left(\frac{\pi \cdot (i+1) \cdot (j+1)}{N+1}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

In order to keep the orthogonality of the transform matrix, the transform matrices are quantized more accurately than the transform matrices in HEVC, with 10-bit representation instead of 8-bit in HEVC. To keep the intermediate values of the transformed coefficients within the range of 16-bit, after horizontal and after vertical transform, all the coefficients are right shifted by 2 more bits, comparing to the right shift used in the current HEVC transforms.

The AMT applies to the CUs with both width and height smaller than or equal to 64, and whether AMT applies or not is controlled by a CU level flag. When the CU level flag is equal to 0, DCT-II is applied in the CU to encode the residue. For luma coding block within an AMT enabled CU, two additional flags are signalled to identify the horizontal and vertical transform to be used. As in HEVC, the residual of a block can be coded with transform skip mode in the JEM. To avoid the redundancy of syntax coding, the transform skip flag is not signalled when the CU level AMT flag is not equal to zero.

For intra residue coding, due to the different residual statistics of different intra prediction modes, a mode-dependent transform candidate selection process is used. Three transform subsets have been defined as shown in Table 2, and the transform subset is selected based on the intra prediction mode, as specified in Table 3.

TABLE 2

Three pre-defined transform candidate sets

| Transform Set | Transform Candidates |
|---|---|
| 0 | DST-VII, DCT-VIII |
| 1 | DST-VII, DST-I |
| 2 | DST-VII, DCT-VIII |

With the subset concept, a transform subset is first identified based on Table 2 using the intra prediction mode of a CU with the CU-level AMT flag is equal to 1. After that, for each of the horizontal and vertical transform, one of the two transform candidates in the identified transform subset, according to in Table 3, is selected based on explicitly signaled with flags.

TABLE 3

Selected (H)orizontal and (V)ertical transform sets for each intra prediction mode

| | | | | | | | Intra Mode | | | | | | | | | | | |
|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | 16 | 17 |
| V | | 2 | 1 | 0 | 1 | 0 | 1 | 0 | 1 | 0 | 1 | 0 | 1 | 0 | 1 | 0 | 0 | 0 | 0 |
| H | | 2 | 1 | 0 | 1 | 0 | 1 | 0 | 1 | 0 | 1 | 0 | 1 | 0 | 1 | 2 | 2 | 2 | 2 |

| | | | | | | | Intra Mode | | | | | | | | | | |
|---|---|---|---|---|---|---|---|---|---|---|---|---|---|---|---|---|---|
| | | 18 | 19 | 20 | 21 | 22 | 23 | 24 | 25 | 26 | 27 | 28 | 29 | 30 | 31 | 32 | 33 | 34 |
| V | | 0 | 0 | 0 | 0 | 0 | 1 | 0 | 1 | 0 | 1 | 0 | 1 | 0 | 1 | 0 | 1 | 0 |
| H | | 2 | 2 | 2 | 2 | 2 | 1 | 0 | 1 | 0 | 1 | 0 | 1 | 0 | 1 | 0 | 1 | 0 |

| | | | | | | | Intra Mode | | | | | | | | | | |
|---|---|---|---|---|---|---|---|---|---|---|---|---|---|---|---|---|---|
| | | 35 | 36 | 37 | 38 | 39 | 40 | 41 | 42 | 43 | 44 | 45 | 46 | 47 | 48 | 49 | 50 | 51 | 52 |
| V | | 1 | 0 | 1 | 0 | 1 | 0 | 1 | 0 | 1 | 0 | 1 | 2 | 2 | 2 | 2 | 2 | 2 | 2 |
| H | | 1 | 0 | 1 | 0 | 1 | 0 | 1 | 0 | 1 | 0 | 1 | 0 | 0 | 0 | 0 | 0 | 0 | 0 |

| | | | | | | | Intra Mode | | | | | | | |
|---|---|---|---|---|---|---|---|---|---|---|---|---|---|---|
| | | 53 | 54 | 55 | 56 | 57 | 58 | 59 | 60 | 61 | 62 | 63 | 64 | 65 | 66 |
| V | | 2 | 2 | 1 | 0 | 1 | 0 | 1 | 0 | 1 | 0 | 1 | 0 | 1 | 0 |
| H | | 0 | 0 | 1 | 0 | 1 | 0 | 1 | 0 | 1 | 0 | 1 | 0 | 1 | 0 |

For inter prediction residual, however, only one transform set, which consists of DST-VII and DCT-VIII, is used for all inter modes and for both horizontal and vertical transforms.

In VVC, only one transform set, which includes DST-VII and DCT-VIII, is adopted, and MTS is applied up to 32-point.

The DCT-II cores show symmetry/anti-symmetry characteristics, as listed below:

Feature #1: Even rows with index 0,2,4, . . . are symmetric with a symmetry point before coefficient no. N/2.

Feature #2: Odd rows with index 1,3,5,7, . . . are anti-symmetric with a symmetry point before coefficient no. N/2.

In addition, the N-point DCT-2 core (denoted by TN) is part of 2N-point DCT-2 (denoted by T2N):

Feature #3: $TN_{x,y}=T2N_{2x,2y}$, where x, y=0, 1, . . . , N−1

Based on the above symmetry/anti-symmetry characteristics (Feature #1 and Feature #2) and the relationship between N-point DCT-2 and 2N-point DCT-2 (Feature #3), a so-called "partial butterfly" implementation is supported to reduce the number of operation counts (multiplications, adds/subs, shifts), and identical results of matrix multiplication can be obtained using partial butterfly.

According to embodiments described herein, if each of the transform bases is either symmetric or anti-symmetric, and the N-point transform is part of the 2N-point transform, it is called a "recursive transform". Examples of recursive transform is DCT-2, Hadamard transform, DCT-1, DST-1, DST-2. Reordering the transform bases of one recursive transform results in another recursive transform.

The related syntax and semantics of MTS in VVC draft version 2 is described below:

7.3.4.8 Transform Unit Syntax

| | Descriptor |
|---|---|
| transform_unit( x0, y0, tbWidth, tbHeight, treeType ) { | |
|     if( treeType = = SINGLE_TREE \|\| treeType = = DUAL_TREE_LUMA ) | |
|         tu_cbf_luma[ x0 ][ y0 ] | ae(v) |
|     if( treeType = = SINGLE_TREE \|\| treeType = = DUAL_TREE_CHROMA ) { | |
|         tu_cbf_cb[ x0 ][ y0 ] | ae(v) |
|         tu_cbf_cr[ x0 ][ y0 ] | ae(v) |
|     } | |
|     if( ( ( ( CuPredMode[ x0 ][ y0 ] = = MODE_INTRA ) && sps_mts_intra_enabled_flag ) \|\| | |
|         ( ( CuPredMode[ x0 ][ y0 ] = = MODE_INTER ) && sps_mts_inter_enabled_flag ) ) | |
|         && tu_cbf_luma[ x0 ][ y0 ] && treeType ! = DUAL_TREE_CHROMA | |
|         && ( tbWidth <= 32 ) && ( tbHeight <= 32 ) ) | |
|         cu_mts_flag[ x0 ][ y0 ] | ae(v) |
|     if( tu_cbf_luma[ x0 ][ y0 ] ) | |
|         residual_coding( x0, y0, log2( tbWidth ), log2( tbHeight ), 0 ) | |
|     if( tu_cbf_cb[ x0 ][ y0 ] ) | |
|         residual_coding( x0, y0, log2( tbWidth / 2 ), log2( tbHeight / 2 ), 1 ) | |
|     if( tu_cbf_cr[ x0 ][ y0 ] ) | |
|         residual_coding( x0, y0, log2( tbWidth / 2 ), log2( tbHeight / 2 ), 2 ) | |
| } | |

7.3.4.9. Residual coding syntax

| | Descriptor |
|---|---|
| residual_coding( x0, y0, log2TbWidth, log2TbHeight, cIdx ) { | |
|     if( transform_skip_enabled_flag && ( cIdx ! = 0 \|\| | |
|     cu_mts_flag[ x0 ][ y0 ] = = 0 ) && | |
|         ( log2TbWidth <= 2 ) && ( log2TbHeight <= 2 ) ) | |
|         transform_skip_flag [ x0 ][ y0 ][ cIdx ] | ae(v) |
|     last_sig_coeff_x_prefix | ae(v) |
|     last_sig_coeff_y_prefix | ae(v) |
|     if( last_sig_coeff_x_prefix > 3 ) | |
|         last_sig_coeff_x_suffix | ae(v) |
|     if( last_sig_coeff_y_prefix > 3 ) | |
|         last_sig_coeff_y_suffix | ae(v) |
|     ...... | |
|         if( dep_quant_enabled_flag ) { | |
|             QState = startQStateSb | |
|             for( n = numSbCoeff − 1; n >= 0; n− − ) { | |
|                 xC = ( xS << log2SbSize ) + | |
|                     DiagScanOrder[ log2SbSize ][ log2SbSize ][ n ][ 0 ] | |
|                 yC = ( yS << log2SbSize ) + | |
|                     DiagScanOrder[ log2SbSize ][ log2SbSize ][ n ][ 1 ] | |
|                 if( sig_coeff_flag[ xC ][ yC ] ) | |
|                     TransCoeffLevel[ x0 ][ y0 ][ cIdx ][ xC ][ yC ] = | |
|                       ( 2 * AbsLevel[ xC ][ yC ] − ( QState > 1 ? 1 : 0 ) ) * | |
|                       ( 1 − 2 * coeff_sign_flag[ n ] ) | |
|                 QState = QStateTransTable[ QState ][ par_level_flag[ n ] ] | |
|         } else { | |
|             sumAbsLevel = 0 | |
|             for( n = numSbCoeff − 1; n >= 0; n− − ) { | |
|                 xC = ( xS << log2SbSize ) + | |
|                     DiagScanOrder[ log2SbSize ][ log2SbSize ][ n ][ 0 ] | |
|                 yC = ( yS << log2SbSize ) + | |
|                     DiagScanOrder[ log2SbSize ][ log2SbSize ][ n ][ 1 ] | |
|                 if( sig_coeff_flag[ xC ][ yC ] ) { | |
|                     TransCoeffLevel[ x0 ][ y0 ][ cIdx ][ xC ][ yC ] = | |
|                       AbsLevel[ xC ][ yC ] * ( 1 − 2 * coeff_sign_flag[ n ] ) | |
|                   if( signHidden ) { | |
|                     sumAbsLevel += AbsLevel[ xC ][ yC ] | |
|                     if( ( n = = firstSigScanPosSb ) && ( sumAbsLevel % 2 ) = = 1 ) ) | |
|                       TransCoeffLevel[ x0 ][ y0 ][ cIdx ][ xC ] [ yC ] = | |
|                         −TransCoeffLevel[ x0 ][ y0 ][ cIdx ][ xC ][ yC ] | |
|                   } | |
|                 } | |
|             } | |
|         } | |
|     } | |

-continued

| | Descriptor |
|---|---|
| ```
if( cu_mts_flag[ x0 ][ y0 ] && ( cIdx = = 0 ) &&
    !transform_skip_flag[ x0 ][ y0 ][ cIdx ] &&
    ( ( CuPredMode[ x0 ][ y0 ] = = MODE_INTRA && numSigCoeff > 2 ) | |
      ( CuPredMode[ x0 ][ y0 ] = = MODE_INTER ) ) ) {
    mts_idx[ x0 ][ y0 ]
}
``` | ae(v) |

The transform coefficient levels are represented by the arrays TransCoeffLevel[x0][y0][cIdx][xC][yC]. The array indices x0, y0 specify the location (x0, y0) of the top-left luma sample of the considered transform block relative to the top-left luma sample of the picture. The array index cIdx specifies an indicator for the colour component; it is equal to 0 for Y, 1 for coding block (Cb), and 2 for Cr. The array indices xC and yC specify the transform coefficient location (xC, yC) within the current transform block. When the value of TransCoeffLevel[x0][y0][cIdx][xC][yC] is not specified in clause 7.3.4.8, it is inferred to be equal to 0.

The tu_cbf)luma[x0][y0] equal to 1 specifies that the luma transform block contains one or more transform coefficient levels not equal to 0. The array indices x0, y0 specify the location (x0, y0) of the top-left luma sample of the considered transform block relative to the top-left luma sample of the picture.

When tu_cbf_luma[x0][y0] is not present, its value is inferred to be equal to 0.

The tu_cbf_cb[x0][y0] equal to 1 specifies that the Cb transform block contains one or more transform coefficient levels not equal to 0. The array indices x0, y0 specify the top-left location (x0, y0) of the considered transform block. The array index trafoDepth specifies the current subdivision level of a coding block into blocks for the purpose of transform coding. trafoDepth is equal to 0 for blocks that correspond to coding blocks.

When tu_cbf_cb[x0][y0] is not present, its value is inferred to be equal to 0.

The tu_cbf_cr[x0][y0] equal to 1 specifies that the Cr transform block contains one or more transform coefficient levels not equal to 0. The array indices x0, y0 specify the top-left location (x0, y0) of the considered transform block. The array index trafoDepth specifies the current subdivision level of a coding block into blocks for the purpose of transform coding. trafoDepth is equal to 0 for blocks that correspond to coding blocks.

When tu_cbf_cr[x0][y0] is not present, its value is inferred to be equal to 0.

The cu_mts_flag[x0][y0] equal to 1 specifies that multiple transform selection is applied to the residual samples of the associated luma transform block. The cu_mts_flag[x0][y0] equal to 0 specifies that multiple transform selection is not applied to the residual samples of the associated luma transform block. The array indices x0, y0 specify the location (x0, y0) of the top-left luma sample of the considered transform block relative to the top-left luma sample of the picture.

When cu_mts_flag[x0][y0] is not present, it is inferred to be equal to 0.

The array AbsLevel[xC][yC] represents an array of absolute values of transform coefficient levels for the current transform block and the array AbsLevelPass1[xC][yC] represents an array of partially reconstructed absolute values of transform coefficient levels for the current transform block. The array indices xC and yC specify the transform coefficient location (xC, yC) within the current transform block. When the value of AbsLevel[xC][yC] is not specified in clause 7.3.4.8, it is inferred to be equal to 0. When the value of AbsLevelPass1[xC][yC] is not specified in clause 7.3.4.8, it is inferred to be equal to 0.

The variables CoeffMin and CoeffMax specifying the minimum and maximum transform coefficient values are derived as follows:

CoeffMin=(1<<15)

CoeffMax=(1<<15)−1

The array QStateTransTable[ ][ ] is specified as follows:

QStateTransTable[ ][ ]={{0, 2}, {2, 0}, {1, 3}, {3, 1}}

The transform_skip_flag[x0][y0][cIdx] specifies whether a transform is applied to the associated transform block or not. The array indices x0, y0 specify the location (x0, y0) of the top-left luma sample of the considered transform block relative to the top-left luma sample of the picture. The array index cIdx specifies an indicator for the colour component; it is equal to 0 for luma, equal to 1 for Cb and equal to 2 for Cr. The transform_skip_flag[x0][y0][cIdx] equal to 1 specifies that no transform is applied to the current transform block. The transform_skip_flag[x0][y0][cIdx] equal to 0 specifies that the decision whether transform is applied to the current transform block or not depends on other syntax elements. When transform_skip_flag[x0][y0][cIdx] is not present, it is inferred to be equal to 0.

The last_sig_coeff_x_prefix specifies the prefix of the column position of the last significant coefficient in scanning order within a transform block. The values of last_sig_coeff_x_prefix shall be in the range of 0 to (log 2TbWidth<<1)−1, inclusive.

The last_sig_coeff_y_prefix specifies the prefix of the row position of the last significant coefficient in scanning order within a transform block. The values of last_sig_coeff_y_prefix shall be in the range of 0 to (log 2TbHeight<<1)−1, inclusive.

The last_sig_coeff_x_suffix specifies the suffix of the column position of the last significant coefficient in scanning order within a transform block. The values of last_sig_coeff_x_suffix shall be in the range of 0 to (1<<((last_sig_coeff_x_prefix>>1) −1))−1, inclusive.

The column position of the last significant coefficient in scanning order within a transform block LastSignificantCoeffX is derived as follows:
  If last_sig_coeff_x_suffix is not present, the following applies:
    LastSignificantCoeffX=last_sig_coeff_x_prefix
  Otherwise (last_sig_coeff_x_suffix is present), the following applies: LastSignificantCoeffX=(1<<((last_sig_coeff_x_prefix>>1)−1))*(2+(last_sig_coeff_x_prefix & 1))+last_sig_coeff_x_suffix The coeff_sign_flag[n] specifies the sign of a transform coefficient level for the scanning position n as follows:

If coeff_sign_flag[n] is equal to 0, the corresponding transform coefficient level has a positive value.

Otherwise (coeff_sign_flag[n] is equal to 1), the corresponding transform coefficient level has a negative value.

When coeff_sign_flag[n] is not present, it is inferred to be equal to 0.

mts_idx[x0][y0] specifies which transform kernels are applied to the luma residual samples along the horizontal and vertical direction of the current transform block. The array indices x0, y0 specify the location (x0, y0) of the top-left luma sample of the considered transform block relative to the top-left luma sample of the picture.

When mts_idx[x0][y0] is not present, it is inferred to be equal to 1.

In VVC, a Transform Skip (TS) mode is applied for coding both intra and inter prediction residuals. For a coding block (both luma and chroma) with less than or equal to 16 samples, a flag is signaled to indicate whether TS mode is applied for current block. When TS mode is applied, the detailed modifications for each module are listed below.

Prediction: No change.

Transform: Skipped. Instead, for transform skipping TUs, a simple scaling process is used. To let transform skipping coefficients have similar magnitudes as other transform coefficients, a scaling-down process is performed, and the scaling factor is same with the scaling associated with other transforms (versus standard floating point transform with norm 1) of the same size.

De-quantization and scaling. No change.

Entropy coding: A flag is signaled to indicate if transform is bypassed or not.

Deblocking, SAO and ALF: No change.

A flag in the SPS to indicate whether transform skipping is enabled or not.

The related spec text of TS mode in VVC draft version 2 is described below:

7.3.4.9 Residual coding syntax $CoeffMin = (1 << 15)$ $CoeffMax = (1 << 15) - 1$ The array QStateTransTable[ ][ ] is specified as follows:

QStateTransTable[ ][ ]={{0, 2}, {2, 0}, {1, 3}, {3, 1}}

The transform_skip_flag[x0][y0][cIdx] specifies whether a transform is applied to the associated transform block or not. The array indices x0, y0 specify the location (x0, y0) of the top-left luma sample of the considered transform block relative to the top-left luma sample of the picture. The array index cIdx specifies an indicator for the colour component; it is equal to 0 for luma, equal to 1 for Cb and equal to 2 for Cr. transform_skip_flag[x0][y0][cIdx] equal to 1 specifies that no transform is applied to the current transform block. The transform_skip_flag[x0][y0][cIdx] equal to 0 specifies that the decision whether transform is applied to the current transform block or not depends on other syntax elements. When transform_skip_flag[x0][y0][cIdx] is not present, it is inferred to be equal to 0.

The last_sig_coeff_x_prefix specifies the prefix of the column position of the last significant coefficient in scanning order within a transform block. The values of last_sig_coeff_x_prefix shall be in the range of 0 to (log 2TbWidth<<1)−1, inclusive.

For a scaling and transformation process, inputs to this process are:
- a luma location (xTbY, yTbY) specifying the top-left sample of the current luma transform block relative to the top left luma sample of the current picture,
- a variable cIdx specifying the colour component of the current block,
- a variable nTbW specifying the transform block width,
- a variable nTbH specifying the transform block height.

|  | Descriptor |
|---|---|
| residual_coding( x0, y0, log2TbWidth, log2TbHeight, cIdx ) { | |
|   if( transform_skip_enabled_flag && ( cIdx != 0 \|\| | |
|   cu_mts_flag[ x0 ][ y0 ] = = 0 ) && ( log2TbWidth <= 2 ) && ( log2TbHeight <= 2 ) ) | |
|     tranform_skip_flag[x0 ][ y0 ][ cIdx ] | ae(v) |
|   last_sig_coeff_x_prefix | ae(v) |
|   last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|   log2SbSize = ( Min( log2TbWidth, log2TbHeight ) < 2 ? 1 : 2 ) | ae(v) |
|   numSbCoeff = 1 << ( log2SbSize << 1 ) | |
|   lastScanPos = numSbCoeff | |
|   ...... | |

The array AbsLevel[xC][yC] represents an array of absolute values of transform coefficient levels for the current transform block and the array AbsLevelPass1[xC][yC] represents an array of partially reconstructed absolute values of transform coefficient levels for the current transform block. The array indices xC and yC specify the transform coefficient location (xC, yC) within the current transform block. When the value of AbsLevel[xC][yC] is not specified in clause 7.3.4.8, it is inferred to be equal to 0. When the value of AbsLevelPass1[xC][yC] is not specified in clause 7.3.4.8, it is inferred to be equal to 0.

The variables CoeffMin and CoeffMax specifying the minimum and maximum transform coefficient values are derived as follows:

Output of this process is the (nTbW)×(nTbH) array of residual samples resSamples[x][y] with x=0..nTbW−1, y=0..nTbH−1. The variables bitDepth, bdShift and tsShift are derived as follows:

$bitDepth = (cIdx == 0)\,?\,BitDepthY : BitDepthC$ $bdShift = Max(22 - bitDepth, 0)$ $tsShift = 5 + ((\log_2(nTbW) + \log_2(nTbH))/2)$ The (nTbW)×(nTbH) array of residual samples resSamples is derived as follows:
1. The scaling process for transform coefficients as specified in clause 8.3.3 is invoked with the transform block location (xTbY, yTbY), the transform width nTbW and the transform height nTbH, the colour component variable cIdx and the bit depth of the current colour component bitDepth as inputs, and the output is an (nTbW)×(nTbH) array of scaled transform coefficients d.

2. The (nTbW)×(nTbH) array of residual samples r is derived as follows:
   If transform_skip_flag[xTbY][yTbY][cIdx] is equal to 1, the residual sample array values r[x][y] with with x=0..nTbW−1, y=0..nTbH−1 are derived as follows:

$r[x][y]=d[x][y]<<tsShift$

Otherwise (transform_skip_flag[xTbY][yTbY][cIdx] is equal to 0), the transformation process for scaled transform coefficients as specified in clause 8.3.4.1 is invoked with the transform block location (xTbY, yTbY), the transform width nTbW and the transform height nTbH, the colour component variable cIdx and the (nTbW)×(nTbH) array of scaled transform coefficients d as inputs, and the output is an (nTbW)×(nTbH) array of residual samples r.

3. The residual samples resSamples[x][y] with x=0..nTbW−1, y=0..nTbH−1 are derived as follows:

$resSamples[x][y]=(r[x][y]+(1<<(bdShift-1)))>>bdShift$

Further, in HEVC, the primary transforms are 4-point, 8-point, 16-point and 32-point DCT-2, and the transform core matrices are represented using 8-bit integers, i.e., 8-bit transform core. The transform core matrices of smaller DCT-2 are part of larger DCT-2, as shown below:

4×4 transform
{64, 64, 64, 64}
{83, 36, −36, −83)}
{64, −64, −64, 64}
{36, −83, 83, −36}

8×8 transform
{64, 64, 64, 64, 64, 64, 64, 64}
{89, 75, 50, 18, −18, −50, −75, −89}
{83, 36, −36, −83, −83, −36, 36, 83}
{75, −18, −89, −50, 50, 89, 18, −75}
{64, −64, −64, 64, 64, −64, −64, 64}
{50, −89, 18, 75, −75, −18, 89, −50}
{36, −83, 83, −36, −36, 83, −83, 36}
{18, −50, 75, −89, 89, −75, 50, −18)}

16×16 transform
{64 64 64 64 64 64 64 64 64 64 64 64 64 64 64 64}
{90 87 80 70 57 42 25 9 −9 −25 −42 −57 −70 −80 −87 −90}
{89 75 50 18 −18 −50 −75 −89 −89 −75 −50 −18 18 50 75 89}
{87 57 9 −43 −80 −90 −70 −25 25 70 90 80 43 −9 −57 −87}
{83 36 −36 −83 −83 −36 83 83 36 −36 −83 −83 −36 36 83}
{80 9 −70 −87 −25 57 90 43 −43 −90 −57 25 87 70 −9 −80}
{75 −18 −89 −50 50 89 18 −75 −75 18 89 50 −50 −89 −18 75}
{70 −43 −87 9 90 25 −80 −57 57 80 −25 −90 −9 87 43 −70}
{64 −64 −64 64 64 −64 −64 64 64 −64 −64 64 64 −64 −64 64}
{57 −80 −25 90 −9 −87 43 70 −70 43 87 9 −90 25 80 −57}
{50 −89 18 75 −75 −18 90 −50 −50 89 −18 −75 75 18 −89 50}
{43 −90 57 25 −87 70 9 −80 80 −9 −70 87−25 −57 −90 −43}
{36 −83 83 −36 −36 83 −83 36 36 −83 83 −36 −36 83 −83 36}
{25 −70 90 −80 43 9 −57 87 −87 57 −9 −43 80 −90 70 −25}
{18 −50 75 −89 89 −75 50 −18 −18 50 −75 89 89 75 −50 18}
{9 −25 43 −57 70 −80 87 −90 90 −87 80 −70 57 −43 25 −9}

32×32 transform
{64 64 64 64 64 64 64 64 64 64 64 64 64 64 64 64 64 64 64 64 64 64 64 64 64 64 64 64 64 64 64 64}
{90 90 88 85 82 78 73 67 61 54 46 38 31 22 13 4 −4 −13 −22 −31 −38 −46 −54 −61 −67 −73 −78 −82 −85 −88 −90 −90}
{90 87 80 70 57 43 25 9 −9 −25 43 −57 −70 −80 −87 −90 −90 −87 −80 −70 −57−43 −25−9 9 25 43 57 70 80 87 90}
{90 82 67 46 22 −4 −31 −54 −73 −85 −90 −88 −78 −61 −38 −13 13 38 61 78 88 90 85 73 54 31 4 −22 −46 −67 −82 −90}
{89 75 50 18 −18 −50 −75 −89−89 −75−50 −18 18 50 75 89 89 75 50 18 −18 −50 −75 −89−89 −75 −50 −18 18 50 75 89}
{87 57 9 −43 −80 −90 −70 −25 25 70 90 80 43 −9 −57−87 −87 −57 −9 43 80 90 70 25 −25 −70 −90 −80 −43 9 57 87}
{85 46 −13 −67 −90 −73 −22 38 82 88 54 −4 −61 −90 −78 −31 78 90 61 4 −54 −88−82 −38 22 73 90 67 13 −46 −85}
{83 36 −36 −83 −83 −36 36 83 83 36 −36 −83−83 −36 83 83 36 −36 −83 −36 36 83 83 36 −36 83 −83 −36 36 83}
{82 22 −54 −90 −61 13 78 85 31 −46 −90 −67 4 73 88 38 −38 −88 −73 −4 67 90 46 −31 −85 −78 −13 61 90 54 −22 −82}
{80 9 −70 −87 −25 57 90 43 −43 −90 −57 25 87 70 −9 −80 −80 −9 70 87 25 −57 −90 −43 43 90 57 −25 −87 −70 9 80}
{78 −4 −82 −73 13 85 67 −22 −88 −61 31 90 54 −38 −90 −46 46 90 38 −54 −90 −31 61 88 22 −67 −85 −13 73 82 4 −78}
{75 −18 −89 −50 50 89 18 −75 −75 18 89 50 −50 −89 −18 75 75 −18 −89 −50 50 89 18 −75 −75 18 89 50 −50 −89 −18 75}
{73 −31 −90 −22 78 67 −38 −90 −13 82 61 −46 −88 −4 85 54 −54 −85 4 88 46 −61 −82 13 90 38 −67 −78 22 90 31−73}
{70 −43 −87 9 90 25 −80 −57 57 80 −25 −90 −9 87 43 −70 −70 43 87 −9 −90 −25 80 57 −57 −80 25 90 9 −87 −43 70}
{67 −54 −78 38 85 −22 −90 4 90 13 −88 −31 82 46 −73 −61 61 73 −46 −82 31 88 −13 −90 −4 90 22 −85 −38 78 54 −67}
{64 −64 −64 64 64 −64 −64 64 64 −64 −64 64 64 −64 −64 64 64 −64 −64 64 64 −64 −64 64 64 −64 −64 64 64 −64 −64 64}
{61 −73 −46 82 31 −88 −13 90 −4 −90 22 85 −38 −78 54 67 −67 −54 78 38 −85 −22 90 4 −90 13 88 −31 −82 46 73 −61}
{57 −80 −25 90 −9 −87 43 70 −70 −43 87 9 −90 25 80 −57 −57 80 25 −90 9 87 −43 −70 70 43 −87 −9 90 −25 −80 57}
{54 −85 −4 88 −46 −61 82 13 −90 38 67 −78 −22 90 −31 −73 73 31 −90 22 78 −67 −38 90 −13 −82 61 46 −88 4 85 −54}
{50 −89 18 75 −75 −18 89 −50 −50 89 −18 −75 75 18 −89 50 50 −89 18 75 −75 −18 89 −50 −50 89 −18 −75 75 18 −89 50}
{46 −90 38 54 −90 31 61 −88 22 67 −85 13 73 −82 4 78 −78 −4 82 −73 −13 85 −67 −22 88 −61 −31 90 −54 −38 90 −46}

{43 −90 57 25 −87 70 9 −80 80 −9 −70 87 −25 −57 90 −43 −43 90 −57 −25 87 −70 −9 80 −80 9 70 −87 25 57 −90 43}

{38 −88 73 −4 −67 90 −46 −31 85 −78 13 61 −90 54 22 −82 82 −22 −54 90 −61 −13 78 −85 31 46 −90 67 4 −73 88 −38}

{36 −83 83 −36 −36 83 −83 36 36 −83 83 −36 −36 83 −83 36 36 −83 83 −36 −36 83 −83 36 36 −83 83 −36 −36 83 −83 36}

{31 −78 90 −61 4 54 −88 82 −38 −22 73 −90 67 −13 −46 85 −85 46 13 −67 90 −73 22 38 −82 88 −54 −4 61 −90 78 −31}

{25 −70 90 −80 43 9 −57 87 −87 57 −9 −43 80 −90 70 −25 −25 70 −90 80 −43 −9 57 −87 87 −57 9 43 −80 90 −70 25}

{22 −61 85 −90 73 −38 −4 46 −78 90 −82 54 −13 −31 67 −88 88 −67 31 13 −54 82 −90 78 −46 4 38 −73 90 −85 61 −22}

{18 −50 75 −89 89 −75 50 −18 −18 50 −75 89 −89 75 −50 18 18 −50 75 −89 89 −75 50 −18 −18 50 −75 89 −89 75 −50 18}

{13 −38 61 −78 88 −90 85 −73 54 −31 4 22 −46 67 −82 90 −90 82 −67 46 −22 −4 31 −54 73 −85 90 −88 78 −61 38 −13}

{9 −25 43 −57 70 −80 87 −90 90 −87 80 −70 57 −43 25 −9 −9 25 −43 57 −70 80 −87 90 −90 87 −80 70 −57 43 −25 9}

{4 −13 22 −31 38 −46 54 −61 67 −73 78 −82 85 −88 90 −90 90 −90 88 −85 82 −78 73 −67 61 −54 46 −38 31 −22 13 −4}

The DCT-2 cores show symmetry/anti-symmetry characteristics, thus a so-called "partial butterfly" implementation is supported to reduce the number of operation counts (multiplications, adds/subs, shifts), and identical results of matrix multiplication can be obtained using partial butterfly.

In current VVC, besides 4-point, 8-point, 16-point and 32-point DCT-2 transforms which are same with HEVC, additional 2-point and 64-point DCT-2 are also included.

The 64-point DCT-2 core defined in VVC is shown below as a 64×64 matrix:

{
{aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa, aa}

{bf, bg, bh, bi, bj, bk, bl, bm, bn, bo, bp, bq, br, bs, bt, bu, by, bw, bx, by, bz, ca, cb, cc, cd, ce, cf, cg, ch, ci, cj, ck, −ck, −cj, −ci, −ch, −cg, −cf, −ce, −cd, −cc, −cb, −ca, −bz, −by, −bx, −bw, −by, −bu, −bt, −bs, −br, −bq, −bp, −bo, −bn, −bm, −bl, −bk, −bj, −bi, −bh, −bg, −bf}

{ap, aq, ar, as, at, au, av, aw, ax, ay, az, ba, bb, bc, bd, be, −be, −bd, −bc, −bb, −ba, −az, −ay, −ax, −aw, −av, −au, −at, −as, −ar, −aq, −ap, −ap, −aq, −ar, −as, −at, −au, −av, −aw, −ax, −ay, −az, −ba, −bb, −bc, −bd, −be, be, bd, bc, bb, ba, az, ay, ax, aw, av, au, at, as, ar, aq, ap}

{bg, bj, bm, bp, bs, by, by, cb, ce, ch, ck, −ci, −cf, −cc, −bz, −bw, −bt, −bq, −bn, −bk, −bh, −bf, −bi, −bl, −bo, −br, −bu, −bx, −ca, −cd, −cg, −cj, cj, cg, cd, ca, bx, bu, br, bo, bl, bi, bf, bh, bk, bn, bq, bt, bw, bz, cc, cf, ci, −ck, −ch, −ce, −cb, −by, −by, −bs, −bp, −bm, −bj, −bg}

{ah, ai, aj, ak, al, am, an, ao, −ao, −an, −am, −al, −ak, −aj, −ai, −ah, −ah, −ai, −aj, −ak, −al, −am, −an, −ao, ao, an, am, al, ak, aj, ai, ah, ah, ai, aj, ak, al, am, an, ao, −ao, −an, −am, −al, −ak, −aj, −ai, −ah, −ah, −ai, −aj, −ak, −al, −am, −an, −ao, ao, an, am, al, ak, aj, ai, ah}

{bh, bm, br, bw, cb, cg, −ck, −cf, −ca, −by, −bq, −bl, −bg, −bi, −bn, −bs, −bx, −cc, −ch, cj, ce, bz, bu, bp, bk, bf, bj, bo, bt, by, cd, ci, −ci, −cd, −by, −bt, −bo, −bj, −bf, −bk, −bp, −bu, −bz, −ce, −cj, ch, cc, bx, bs, bn, bi, bg, bl, bq, by, ca, cf, ck, −cg, −cb, −bw, −br, −bm, −bh}

{aq, at, aw, az, bc, −be, −bb, −ay, −av, −as, −ap, −ar, −au, −ax, −ba, −bd, bd, ba, ax, au, ar, ap, as, av, ay, bb, be, −bc, −az, −aw, −at, −aq, −aq, −at, −aw, −az, −bc, be, bb, ay, av, as, ap, ar, au, ax, ba, bd, −bd, −ba, −ax, −au, −ar, −ap, −as, −av, −ay, −bb, −be, bc, az, aw, at, aq}

{bi, bp, bw, cd, ck, −ce, −bx, −bq, −bj, −bh, −bo, −by, −cc, −cj, cf, by, br, bk, bg, bn, bu, cb, ci, −cg, −bz, −bs, −bl, −bf, −bm, −bt, −ca, −ch, ch, ca, bt, bm, bf, bl, bs, bz, cg, −ci, −cb, −bu, −bn, −bg, −bk, −br, −by, −cf, cj, cc, by, bo, bh, bj, bq, bx, ce, −ck, −cd, −bw, −bp, −bi}

{ad, ae, af, ag, −ag, −af, −ae, −ad, −ad, −ae, −af, −ag, ag, af, ae, ad, ad, ae, af, ag, −ag, −af, −ae, −ad, −ad, −ae, −af, −ag, ag, af, ae, ad, ad, ae, af, ag, −ag, −af, −ae, −ad, −ad, −ae, −af, −ag, ag, af, ae, ad, ad, ae, af, ag, −ag, −af, −ae, −ad, −ad, −ae, −af, −ag, ag, af, ae, ad}

{bj, bs, cb, ck, −cc, −bt, −bk, −bi, −br, −ca, −cj, cd, bu, bl, bh, bq, bz, ci, −ce, −bv, −bm, −bg, −bp, −by, −ch, cf, bw, bn, bf, bo, bx, cg, −cg, −bx, −bo, −bf, −bn, −bw, −cf, ch, by, bp, bg, bm, bv, ce, −ci, −bz, −bq, −bh, −bl, −bu, −cd, cj, ca, br, bi, bk, bt, cc, −ck, −cb, −bs, −bj}

{ar, aw, bb, −bd, −ay, −at, −ap, −au, −az, −be, ba, av, aq, as, ax, bc, −bc, −ax, −as, −aq, −av, −ba, be, az, au, ap, at, ay, bd, −bb, −aw, −ar, −ar, −aw, −bb, bd, ay, at, ap, au, az, be, −ba, −av, −aq, −as, −ax, −bc, bc, ax, as, aq, av, ba, −be, −az, −au, −ap, −at, −ay, −bd, bb, aw, ar}

{bk, by, cg, −ce, −bt, −bi, −bm, −bx, −ci, cc, br, bg, bo, bz, ck, −ca, −bp, −bf, −bq, −cb, cj, by, bn, bh, bs, cd, −ch, −bw, −bl, −bj, −bu, −cf, cf, bu, bj, bl, bw, ch, −cd, −bs, −bh, −bn, −by, −cj, cb, bq, bf, bp, ca, −ck, −bz, −bo, −bg, −br, −cc, ci, bx, bm, bi, bt, ce, −cg, −by, −bk}

{ai, al, ao, −am, −aj, −ah, −ak, −an, an, ak, ah, aj, am, −ao, −al, −ai, −ai, −al, −ao, am, aj, ah, ak, an, −an, −ak, −ah, −aj, −am, ao, al, ai, ai, al, ao, −am, −aj, −ah, −ak, −an, an, ak, ah, aj, am, −ao, −al, −ai, −ai, −al, −ao, am, aj, ah, ak, an, −an, −ak, −ah, −aj, −am, ao, al, ai}

{bl, by, −ck, −bx, −bk, −bm, −bz, cj, bw, bj, bn, ca, −ci, −bi, −bo, −cb, ch, bu, bh, bp, cc, −cg, −bt, −bg, −bq, −cd, cf, bs, bf, br, ce, −ce, −br, −bf, −bs, −cf, cd, bq, bg, bt, cg, −cc, −bp, −bh, −bu, −ch, cb, bo, bi, by, ci, −ca, −bn, −bj, −bw, −cj, bz, bm, bk, bx, ck, −by, −bl}

{as, az, −bd, −aw, −ap, −av, −bc, ba, at, ar, ay, −be, −ax, −aq, −au, −bb, bb, au, aq, ax, be, −ay, −ar, −at, −ba, bc, av, ap, aw, bd, −az, −as, −as, −az, bd, aw, ap, av, bc, −ba, −at, −ar, −ay, be, ax, aq, au, bb, −bb, −au, −aq, −ax, −be, ay, ar, at, ba, −bc, −av, −ap, −aw, −bd, az, as}

{bm, cb, −cf, −bq, −bi, −bx, cj, bu, bf, bt, ci, −by, −bj, −bp, −ce, cc, bn, bl, ca, −cg, −br, −bh, −bw, ck, by, bg, bs, ch, −bz, −bk, −bo, −cd, cd, bo, bk, bz, −ch, −bs, −bg, −bv, −ck, bw, bh, br, cg, −ca, −bl, −bn, −cc, ce, bp, bj, by, −ci, −bt, −bf, −bu, −cj, bx, bi, bq, cf, −cb, −bm}

{ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab, ab, ac, −ac, −ab, −ab, −ac, ac, ab}

{bn, ce, −ca, −bj, −br, −ci, bw, bf, by, −cj, −bs, −bi, −bz, cf, bo, bm, cd, −cb, −bk, −bq, −ch, bx, bg, bu, −ck, −bt, −bh, −by, cg, bp, bl, cc, −cc, −bl, −bp, −cg, by, bh, bt, ck, −bu, −bg, −bx, ch, bq, bk, cb, −cd, −bm, −bo, −cf, bz, bi, bs, cj, −by, −bf, −bw, ci, br, bj, ca, −ce, −bn}

{at, bc, −ay, −ap, −ax, bd, au, as, bb, −az, −aq, −aw, be, av, ar, ba, −ba, −ar, −av, −be, aw, aq, az, −bb, −as, −au, −bd, ax, ap, ay, −bc, −at, −at, −bc, ay, ap, ax, −bd, −au, −as, −bb, az, aq, aw, −be, −av, −ar, −ba, ba, ar, av, be, −aw, −aq, −az, bb, as, au, bd, −ax, −ap, −ay, bc, at}

{bo, ch, −bh, −ca, cc, bj, bt, −cj, −bq, −bm, −cf, bx, bf, by, −ce, −bl, −br, −ck, bs, bk, cd, −bz, −bg, −bw, cg, bn, bp, ci, −bu, −bi, −cb, cb, bi, bu, −ci, −bp, −bn, −cg, bw, bg, bz, −cd, −bk, −bs, ck, br, bl, ce, −by, −bf, −bx, cf, bm, bq, cj, −bt, −bj, −cc, ca, bh, by, −ch, −bo}P {aj, ao, −ak, −ai, −an, al, ah, am, −am, −ah, −al, an, ai, ak, −ao, −aj, −aj, −ao, ak, ai, an, −al, −ah, −am, am, ah, al, −an, −ai, −ak, ao, aj, aj, ao, −ak, −ai, −an, al, ah, am, −am, −ah, −al, an, ai, ak, −ao, −aj, −aj, −ao, ak, ai, an, −al, −ah, −am, am, ah, al, −an, −ai, −ak, ao, aj}

{bp, ck, −bq, −bo, −cj, br, bn, ci, −bs, −bm, −ch, bt, bl, cg, −bu, −bk, −cf, by, bj, ce, −bw, −bi, −cd, bx, bh, cc, −by, −bg, −cb, bz, bf, ca, −ca, −bf, −bz, cb, bg, by, −cc, −bh, −bx, cd, bi, bw, −ce, −bj, −by, cf, bk, bu, −cg, −bl, −bt, ch, bm, bs, −ci, −bn, −br, cj, bo, bq, −ck, −bp}

{au, −be, −at, −av, bd, as, aw, −bc, −ar, −ax, bb, aq, ay, −ba, −ap, −az, az, ap, ba, −ay, −aq, −bb, ax, ar, bc, −aw, −as, −bd, av, at, be, −au, −au, be, at, av, −bd, −as, −aw, bc, ar, ax, −bb, −aq, −ay, ba, ap, az, −az, −ap, −ba, ay, aq, bb, −ax, −ar, −bc, aw, as, bd, −av, −at, −be, au}

{bq, −ci, −bl, −by, cd, bg, ca, −by, −bi, −cf, bt, bn, ck, −bo, −bs, cg, bj, bx, −cb, −bf, −cc, bw, bk, ch, −br, −bp, cj, bm, bu, −ce, −bh, −bz, bz, bh, ce, −bu, −bm, −cj, bp, br, −ch, −bk, −bw, cc, bf, cb, −bx, −bj, −cg, bs, bo, −ck, −bn, −bt, cf, bi, by, −ca, −bg, −cd, by, bl, ci, −bq}

{ae, −ag, −ad, −af, af, ad, ag, −ae, −ae, ag, ad, af, −af, −ad, −ag, ae, ae, −ag, −ad, −af, af, ad, ag, −ae, −ae, ag, ad, af, −af, −ad, −ag, ae, ae, −ag, −ad, −af, af, ad, ag, −ae, −ae, ag, ad, af, −af, −ad, −ag, ae, ae, −ag, −ad, −af, af, ad, ag, −ae, −ae, ag, ad, af, −af, −ad, −ag, ae}

{br, −cf, −bg, −cc, bu, bo, −ci, −bj, −bz, bx, bl, ck, −bm, −bw, ca, bi, ch, −bp, −bt, cd, bf, ce, −bs, −bq, cg, bh, cb, −by, −bn, cj, bk, by, −by, −bk, −cj, bn, by, −cb, −bh, −cg, bq, bs, −ce, −bf, −cd, bt, bp, −ch, −bi, −ca, bw, bm, −ck, −bl, −bx, bz, bj, ci, −bo, −bu, cc, bg, cf, −br}

{av, −bb, −ap, −bc, au, aw, −ba, −aq, −bd, at, ax, −az, −ar, −be, as, ay, −ay, −as, be, ar, az, −ax, −at, bd, aq, ba, −aw, −au, bc, ap, bb, −av, −av, bb, ap, bc, −au, −aw, ba, aq, bd, −at, −ax, az, ar, be, −as, −ay, ay, as, −be, −ar, −az, ax, at, −bd, −aq, −ba, aw, au, −bc, −ap, −bb, av}

{bs, −cc, −bi, −cj, bl, bz, −by, −bp, cf, bf, cg, −bo, −bw, by, bm, −ci, −bh, −cd, br, bt, −cb, −bj, −ck, bk, ca, −bu, −bq, ce, bg, ch, −bn, −bx, bx, bn, −ch, −bg, −ce, bq, bu, −ca, −bk, ck, bj, cb, −bt, −br, cd, bh, ci, −bm, −by, bw, bo, −cg, −bf −cf, bp, by, −bz, −bl, cj, bi, cc, −bs}

{ak, −am, −ai, ao, ah, an, −aj, −al, al, aj, −an, −ah, −ao, ai, am, −ak, −ak, am, ai, −ao, −ah, −an, aj, al, −al, −aj, an, ah, ao, −ai, −am, ak, ak, −am, −ai, ao, ah, an, −aj, −al, al, aj, −an, −ah, −ao, ai, am, −ak, −ak, am, ai, −ao, −ah, −an, aj, al, −al, −aj, an, ah, ao, −ai, −am, ak}

{bt, −bz, −bn, cf, bh, ck, −bi, −ce, bo, by, −bu, −bs, ca, bm, −cg, −bg, −cj, bj, cd, −bp, −bx, by, br, −cb, −bl, ch, bf, ci, −bk, −cc, bq, bw, −bw, −bq, cc, bk, −ci, −bf, −ch, bl, cb, −br, −bv, bx, bp, −cd, −bj, cj, bg, cg, −bm, −ca, bs, bu, −by, −bo, ce, bi, −ck, −bh, −cf, bn, bz, −bt)}

{aw, −ay, −au, ba, as, −bc, −aq, be, ap, bd, −ar, −bb, at, az, −av, −ax, ax, av, −az, −at, bb, ar, −bd, −ap, −be, aq, bc, −as, −ba, au, ay, −aw, −aw, ay, au, −ba, −as, bc, aq, −be, −ap, −bd, ar, bb, −at, −az, av, ax, −ax, −av, az, at, −bb, −ar, bd, ap, be, −aq, −bc, as, ba, −au, −ay, aw}

{bu, −bw, −bs, by, bq, −ca, −bo, cc, bm, −ce, −bk, cg, bi, −ci, −bg, ck, bf, cj, −bh, −ch, bj, cf, −bl, −cd, bn, cb, −bp, −bz, br, bx, −bt, −by, by, bt, −bx, −br, bz, bp, −cb, −bn, cd, bl, −cf, −bj, ch, bh, −cj, −bf, −ck, bg, ci, −bi, −cg, bk, ce, −bm, −cc, bo, ca, −bq, −by, bs, bw, −bu}

{aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa, aa, −aa, −aa, aa}

{by, −bt, −bx, br, bz, −bp, −cb, bn, cd, −bl, −cf, bj, ch, −bh, −cj, bf, −ck, −bg, ci, bi, −cg, −bk, ce, bm, −cc, −bo, ca, bq, −by, −bs, bw, bu, −bu, −bw, bs, by, −bq, −ca, bo, cc, −bm, −ce, bk, cg, −bi, −ci, bg, ck, −bf, cj, bh, −ch, −bj, cf, bl, −cd, −bn, cb, bp, −bz, −br, bx, bt, −bv}

{ax, −av, −az, at, bb, −ar, −bd, ap, −be, −aq, bc, as, −ba, −au, ay, aw, −aw, −ay, au, ba, −as, −bc, aq, be, −ap, bd, ar, −bb, −at, az, av, −ax, −ax, av, az, −at, −bb, ar, bd, −ap, −be, aq, −bc, −as, ba, au, −ay, −aw, aw, ay, −au, −ba, as, bc, −aq, −be, ap, −bd, −ar, bb, at, −az, −av, ax}

{bw, −bq, −cc, bk, ci, −bf, ch, bl, −cb, −br, by, bx, −bp, −cd, bj, cj, −bg, cg, bm, −ca, −bs, bu, by, −bo, −ce, bi, ck, −bh, cf, bn, −bz, −bt, bt, bz, −bn, −cf, bh, −ck, −bi, ce, bo, −by, −bu, bs, ca, −bm, −cg, bg, −cj, −bj, cd, bp, −bx, −by, br, cb, −bl, −ch, bf, −ci, −bk, cc, bq, −bw}

{al, −aj, −an, ah, −ao, −ai, am, ak, −ak, −am, ai, ao, −ah, an, aj, −al, −al, aj, an, −ah, ao, ai, −am, −ak, ak, am, −ai, −ao, ah, −an, −aj, al, al, −aj, −an, ah, −ao, −ai, am, ak, −ak, −am, ai, ao, −ah, an, aj, −al, −al, aj, an, −ah, ao, ai, −am, −ak, ak, am, −ai, −ao, ah, −an, −aj, al}

{bx, −bn, −ch, bg, −ce, −bq, bu, ca, −bk, −ck, bj, −cb, −bt, br, cd, −bh, ci, bm, −by, −bw, bo, cg, −cf, bp, −by, −bz, bl, cj, −bi, cc, bs, −bs, −cc, bi, −cj, −bl, bz, by, −bp, −cf, bf, −cg, −bo, bw, by, −bm, −ci, bh, −cd, −br, bt, cb, −bj, ck, bk, −ca, −bu, bq, ce, −bg, ch, bn, −bx}

{ay, −as, −be, ar, −az, −ax, at, bd, −aq, ba, aw, −au, −bc, ap, −bb, −av, av, bb, −ap, bc, au, −aw, −ba, aq, −bd, −at, ax, az, −ar, be, as, −ay, −ay, as, be, −ar, az, ax, −at, −bd, aq, −ba, −aw, au, bc, −ap, bb, av, −av, −bb, ap, −bc, −au, aw, ba, −aq, bd, at, −ax, −az, ar, −be, −as, ay}

{by, −bk, cj, bn, −by, −cb, bh, −cg, −bq, bs, ce, −bf, cd, bt, −bp, −ch, bi, −ca, −bw, bm, ck, −bl, bx, bz, −bj, ci, bo, −bu, −cc, bg, −cf, −br, br, cf, −bg, cc, bu, −bo, −ci, bj, −bz, −bx, bl, −ck, −bm, bw, ca, −bi, ch, bp, −bt, −cd, bf, −ce, −bs, bq, cg, −bh, cb, by, −bn, −cj, bk, −by}

{af, −ad, ag, ae, −ae, −ag, ad, −af, −af, ad, −ag, −ae, ae, ag, −ad, af, af, −ad, ag, ae, −ae, −ag, ad, −af, −af, ad, −ag, −ae, ae, ag, −ad, af, af, −ad, ag, ae, −ae, −ag, ad, −af, −af, ad, −ag, −ae, ae, ag, −ad, af, af, −ad, ag, ae, −ae, −ag, ad, −af, −af, ad, −ag, −ae, ae, ag, −ad, af}

{bz, −bh, ce, bu, −bm, cj, bp, −br, −ch, bk, −bw, −cc, bf, −cb, −bx, bj, −cg, −bs, bo, ck, −bn, bt, cf, −bi, by, ca, −bg, cd, by, ci, bl, −by, −bq, −cl, bg, −ca, −by, bi, −cf, −bt, bn, −ck, −bo, bs, cg, −bj, bx, cb, −bf, cc, bw, −bk, ch, br, −bp, −cj, bm, −bu, −ce, bh, −bz}

{az, −ap, ba, ay, −aq, bb, ax, −ar, bc, aw, −as, bd, av, −at, be, au, −au, −be, at, −av, −bd, as, −aw, −bc, ar, −ax, −bb, aq, −ay, −ba, ap, −az, −az, ap, −ba, −ay, aq, −bb, −ax, ar, −bc, −aw, as, −bd, −av, at, −be, −au, au, be, −at, av, bd, −as, aw, bc, −ar, ax, bb, −aq, ay, ba, −ap, az}

{ca, −bf, bz, cb, −bg, by, cc, −bh, bx, cd, −bi, bw, ce, −bj, by, cf, −bk, bu, cg, −bl, bt, ch, −bm, bs, ci, −bn, br, cj, −bo, bq, ck, −bp, bp, −ck, −bq, bo, −cj, −br, bn, −ci, −bs, bm, −ch, −bt, bl, −cg, −bu, bk, −cf, −by, bj, −ce, −bw, bi, −cd, −bx, bh, −cc, −by, bg, −cb, −bz, bf, −ca}

{am, −ah, al, an, −ai, ak, ao, −aj, aj, −ao, −ak, ai, −an, −al, ah, −am, −am, ah, −al, −an, ai, −ak, −ao, aj, −aj, ao, ak, −ai, an, al, −ah, am, am, −ah, al, an, −ai, ak, ao, −aj, aj, −ao, −ak, ai, −an, −al, ah, −am, −am, ah, −al, −an, ai, −ak, −ao, aj, −aj, ao, ak, −ai, an, al, −ah, am}

{cb, −bi, bu, ci, −bp, bn, −cg, −bw, bg, −bz, −cd, bk, −bs, −ck, br, −bl, ce, by, −bf, bx, cf, −bm, bq, −cj, −bt, bj, −cc, −ca, bh, −by, −ch, bo, −bo, ch, by, −bh, ca, cc, −bj, bt, cj, −bq, bm, −cf, −bx, bf, −by, −ce, bl, −br, ck, bs, −bk, cd, bz, −bg, bw, cg, −bn, bp, −ci, −bu, bi, −cb}

{ba, −ar, av, −be, −aw, aq, −az, −bb, as, −au, bd, ax, −ap, ay, bc, −at, at, −bc, −ay, ap, −ax, −bd, au, −as, bb, az, −aq, aw, be, −av, ar, −ba, −ba, ar, −av, be, aw, −aq, az, bb, −as, au, −bd, −ax, ap, −ay, −bc, at, −at, bc, ay, −ap, ax, bd, −au, as, −bb, −az, aq, −aw, −be, av, −ar, ba)}
{cc, −bl, bp, −cg, −by, bh, −bt, ck, bu, −bg, bx, ch, −bq, bk, −cb, −cd, bm, −bo, cf, bz, −bi, bs, −cj, −by, bf, −bw, −ci, br, −bj, ca, ce, −bn, bn, −ce, −ca, bj, −br, ci, bw, −bf, by, cj, −bs, bi, −bz, −cf, bo, −bm, cd, cb, −bk, bq, −ch, −bx, bg, −bu, −ck, bt, −bh, by, cg, −bp, bl, −cc}
{ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac, ac, −ab, ab, −ac, −ac, ab, −ab, ac}
{cd, −bo, bk, −bz, −ch, bs, −bg, by, −ck, −bw, bh, −br, cg, ca, −bl, bn, −cc, −ce, bp, −bj, by, ci, −bt, bf, −bu, cj, bx, −bi, bq, −cf, −cb, bm, −bm, cb, cf, −bq, bi, −bx, −cj, bu, −bf, bt, −ci, −by, bj, −bp, cc, cc, −bn, bl, −ca, −cg, br, −bh, bw, ck, −by, bg, −bs, ch, bz, −bk, bo, −cd}
{bb, −au, aq, −ax, be, ay, −ar, at, −ba, −bc, av, −ap, aw, −bd, −az, as, −as, az, bd, −aw, ap, −av, bc, ba, −at, ar, −ay, −be, ax, −aq, au, −bb, −bb, au, −aq, ax, −be, −ay, ar, −at, ba, bc, −av, ap, −aw, bd, az, −as, as, −az, −bd, aw, −ap, av, −bc, −ba, at, −ar, ay, be, −ax, aq, −au, bb}
{ce, −br, bf, −bs, cf, cd, −bq, bg, −bt, cg, cc, −bp, bh, −bu, ch, cb, −bo, bi, −by, ci, ca, −bn, bj, −bw, cj, bz, −bm, bk, −bx, ck, by, −bl, bl, −by, −ck, bx, −bk, bm, −bz, −cj, bw, −bj, bn, −ca, −ci, by, −bi, bo, −cb, −ch, bu, −bh, bp, −cc, −cg, bt, −bg, bq, −cd, −cf, bs, −bf, br, −ce}
{an, −ak, ah, −aj, am, ao, −al, ai, −ai, al, −ao, −am, aj, −ah, ak, −an, −an, ak, −ah, aj, −am, −ao, al, −ai, ai, −al, ao, am, −aj, ah, −ak, an, an, −ak, ah, −aj, am, ao, −al, ai, −ai, al, −ao, −am, aj, −ah, ak, −an, −an, ak, −ah, aj, −am, −ao, al, −ai, ai, −al, ao, am, −aj, ah, −ak, an}
{cf, −bu, bj, −bl, bw, −ch, −cd, bs, −bh, bn, −by, cj, cb, −bq, bf, −bp, ca, ck, −bz, bo, −bg, br, −cc, −ci, bx, −bm, bi, −bt, ce, cg, −by, bk, −bk, by, −cg, −ce, bt, −bi, bm, −bx, ci, cc, −br, bg, −bo, bz, −ck, −ca, bp, −bf, bq, −cb, −cj, by, −bn, bh, −bs, cd, ch, −bw, bl, −bj, bu, −cf}
{bc, −ax, as, −aq, av, −ba, −be, az, −au, ap, −at, ay, −bd, −bb, aw, −ar, ar, −aw, bb, bd, −ay, at, −ap, au, −az, be, ba, −av, aq, −as, ax, −bc, −bc, ax, −as, aq, −av, ba, be, −az, au, −ap, at, −ay, bd, bb, −aw, ar, −ar, aw, −bb, −bd, ay, −at, ap, −au, az, −be, −ba, av, −aq, as, −ax, bc}
{cg, −bx, bo, −bf, bn, −bw, cf, ch, −by, bp, −bg, bm, −by, ce, ci, −bz, bq, −bh, bl, −bu, cd, cj, −ca, br, −bi, bk, −bt, cc, ck, −cb, bs, −bj, bj, −bs, cb, −ck, −cc, bt, −bk, bi, −br, ca, −cj, −cd, bu, −bl, bh, −bq, bz, −ci, −ce, by, −bm, bg, −bp, by, −ch, −cf, bw, −bn, bf, −bo, bx, −cg}
{ag, −af, ae, −ad, ad, −ae, af, −ag, −ag, af, −ae, ad, −ad, ae, −af, ag, ag, −af, ae, −ad, ad, −ae, af, −ag, −ag, af, −ae, ad, −ad, ae, −af, ag, ag, −af, ae, −ad, ad, −ae, af, −ag, −ag, af, −ae, ad, −ad, ae, −af, ag, ag, −af, ae, −ad, ad, −ae, af, −ag, −ag, af, −ae, ad, −ad, ae, −af, ag}
{ch, −ca, bt, −bm, bf, −bl, bs, −bz, cg, ci, −cb, bu, −bn, bg, −bk, br, −by, cf, cj, −cc, by, −bo, bh, −bj, bq, −bx, ce, ck, −cd, bw, −bp, bi, −bi, bp, −bw, cd, −ck, −ce, bx, −bq, bj, −bh, bo, −by, cc, −cj, −cf, by, −br, bk, −bg, bn, −bu, cb, −ci, −cg, bz, −bs, bl, −bf, bm, −bt, ca, −ch}
{bd, −ba, ax, −au, ar, −ap, as, −av, ay, −bb, be, bc, −az, aw, −at, aq, −aq, at, −aw, az, −bc, −be, bb, −ay, av, −as, ap, −ar, au, −ax, ba, −bd, −bd, ba, −ax, au, −ar, ap, −as, av, −ay, bb, −be, −bc, az, −aw, at, −aq, aq, −at, aw, −az, bc, be, −bb, ay, −av, as, −ap, ar, −au, ax, −ba, bd}
{ci, −cd, by, −bt, bo, −bj, bf, −bk, bp, −bu, bz, −ce, cj, ch, −cc, bx, −bs, bn, −bi, bg, −bl, bq, −by, ca, −cf, ck, cg, −cb, bw, −br, bm, −bh, bh, −bm, br, −bw, cb, −cg, −ck, cf, −ca, by, −bq, bl, −bg, bi, −bn, bs, −bx, cc, −ch, −cj, ce, −bz, bu, −bp, bk, −bf, bj, −bo, bt, −by, cd, −ci}
{ao, −an, am, −al, ak, −aj, ai, −ah, ah, −ai, aj, −ak, al, −am, an, −ao, −ao, an, −am, al, −ak, aj, −ai, ah, −ah, ai, −aj, ak, −al, am, −an, ao, ao, −an, am, −al, ak, −aj, ai, −ah, ah, −ai, aj, −ak, al, −am, an, −ao, −ao, an, −am, al, −ak, aj, −ai, ah, −ah, ai, −aj, ak, −al, am, −an, ao}
{cj, −cg, cd, −ca, bx, −bu, br, −bo, bl, −bi, bf, −bh, bk, −bn, bq, −bt, bw, −bz, cc, −cf, ci, ck, −ch, ce, −cb, by, −by, bs, −bp, bm, −bj, bg, −bg, bj, −bm, bp, −bs, by, −by, cb, −ce, ch, −ck, −ci, cf, −cc, bz, −bw, bt, −bq, bn, −bk, bh, −bf, bi, −bl, bo, −br, bu, −bx, ca, −cd, cg, −cj}
{be, −bd, bc, −bb, ba, −az, ay, −ax, aw, −av, au, −at, as, −ar, aq, −ap, ap, −aq, ar, −as, at, −au, av, −aw, ax, −ay, az, −ba, bb, −bc, bd, −be, −be, bd, −bc, bb, −ba, az, −ay, ax, −aw, av, −au, at, −as, ar, −aq, ap, −ap, aq, −ar, as, −at, au, −av, aw, −ax, ay, −az, ba, −bb, bc, −bd, be}
{ck, −cj, ci, −ch, cg, −cf, ce, −cd, cc, −cb, ca, −bz, by, −bx, bw, −by, bu, −bt, bs, −br, bq, −bp, bo, −bn, bm, −bl, bk, −bj, bi, −bh, bg, −bf, bf, −bg, bh, −bi, bj, −bk, bl, −bm, bn, −bo, bp, −bq, br, −bs, bt, −bu, by, −bw, bx, −by, bz, −ca, cb, −cc, cd, −ce, cf, −cg, ch, −ci, cj, −ck}} where
{aa, ab, ac, ad, ae, af, ag, ah, ai, aj, ak, al, am, an, ao, ap, aq, ar, as, at, au, av, aw, ax, ay, az, ba, bb, bc, bd, be, bf, bg, bh, bi, bj, bk, bl, bm, bn, bo, bp, bq, br, bs, bt, bu, by, bw, bx, by, bz, ca, cb, cc, cd, ce, cf, cg, ch, ci, cj, ck}=
{64, 83, 36, 89, 75, 50, 18, 90, 87, 80, 70, 57, 43, 25, 9, 90, 90, 88, 85, 82, 78, 73, 67, 61, 54, 46, 38, 3 1, 22, 13, 4, 91, 90, 90, 90, 88, 87, 86, 84, 83, 81, 79, 77, 73, 71, 69, 65, 62, 59, 56, 52, 48, 44, 41, 37, 33, 28, 24, 20, 15, 11, 7, 2}

In addition to DCT-2 and 4×4 DST-7 which have been employed in HEVC, an Adaptive Multiple Transform (AMT, or as known as Enhanced Multiple Transform (EMT), or as known as Multiple Transform Selection (MTS)) scheme has been used in VVC for residual coding for both inter and intra coded blocks. It uses multiple selected transforms from the DCT/DST families other than the current transforms in HEVC. The newly introduced transform matrices are DST-7, DCT-8. Table 1 shows the basis functions of the selected DST/DCT such as DCT-2, DCT-8, and DST-7. It will be understood that roman numerals and arabic numerals are interchangeable in this context.

All the primary transform matrices in VVC are used with 8-bit representation. The AMT applies to the CUs with both width and height smaller than or equal to 32, and whether AMT applies or not is controlled by a flag called mts_flag. When the mts_flag is equal to 0, only DCT-2 is applied for coding the residue. When the mts_flag is equal to 1, an index mts_idx is further signalled using 2 bins to identify the horizontal and vertical transform to be used according Table 2, where value 1 means using DST-7 and value 2 means using DCT-8.

TABLE 2

Specification of trTypeHor and trTypeVer depending on mts_idx[ x ][ y ][ cIdx ]

| mts_idx[ xTbY ][ yTbY ][ cIdx ] | trTypeHor | trTypeVer |
|---|---|---|
| −1 | 0 | 0 |
| 0 | 1 | 1 |
| 1 | 2 | 1 |
| 2 | 1 | 2 |
| 3 | 2 | 2 |

The transform core, which is a matrix composed by the basis vectors, of DST-7 can be also represented below:

4-point DST-7
{a, b, c, d}
{c, c, 0, −c}
{d, −a, −c, b}
{b, −d, c, −a}
where {a, b, c, d}={29, 55, 74, 84}

8-point DST-7
{a, b, c, d, e, f, g, h}
{b, e, h, −g, −d, −a, −c, −f,}
{c, h, −e, −a, −f, g, b, d,}
{d, −g, −a, −h, c, e, −f, −b,}
{e, −d, −f, c, g, −b, −h, a,}
{f, −a, g, e, −b, h, d, −c,}
{g, −c, b, −f, −h, d, −a, e,}
{h, −f, d, −b, a, −c, e, −g,}
where {a, b, c, d, e, f, g, h}={86,85,78,71,60,46,32,17}

16-point DCT-8:
{a, b, c, d, e, f, g, h, i, j, k, l, m, n, o, p,}
{b, e, h, k, n, 0, −n, −k, −h, −e, −b, −b, −e, −h, −k, −n,}
{c, h, m, −p, −k, −f, −a, −e, −j, −o, n, i, d, b, g, l,}
{d, k, −p, −i, −b, −f, −m, n, g, a, h, o, −l, −e, −c, −j,}
{e, n, −k, −b, −h, 0, h, b, k, −n, −e, −e, −n, k, b, h,}
{f, 0, −f, −f, 0, f, f, 0, −f, −f, 0, f, f, 0, −f, −f,}
{g, −n, −a, −m, h, f, −o, −b, −l, i, e, −p, −c, −k, j, d,}
{h, −k, −e, n, b, 0, −b, −n, e, k, −h, k, e, −n, −b,}
{i, −h, −j, g, k, −f, −l, e, m, −d, −n, c, o, −b, −p, a,}
{j, −e, −o, a, −n, −f, i, k, −d, −p, b, −m, −g, h, l, −c,}
{k, −b, n, h, −e, 0, e, −h, −n, b, −k, −k, b, −n, −h, e,}
{l, −b, i, o, −e, f, −p, −h, c, −m, −k, a, −j, −n, d, −g,}
{m, −e, d, −l, −n, f, −c, k, o, −g, b, −j, −p, h, −a, i,}
{n, −h, b, −e, k, 0, −k, e, −b, h, −n, −n, h, −b, e, −k,}
{o, −k, g, −c, b, −f, j, −n, −p, l, −h, d, −a, e, −i, m,}
{p, −n, l, −j, h, −f, d, −b, a, −c, e, −g, i, −k, m, −o,}
where {a, b, c, d, e, f, g, h, i, j, k, l, m, n, o, p}=
{90,89,87,83,81,77,72,66,62,56,49,41,33,25,17, 9}

32-point DCT-8:
{a, b, c, d, e, f, g, h, i, j, k, l, m, n, o, p, q, r, s, t, u, v, w, x, y, z, A, B, C, D, E, F,}
{b, e, h, k, n, q, t, w, z, C, F, −E, −B, −y, −v, −s, −p, −m, −j, −g, −d, −a, −c, −f, −l, −o, −r, −u, −x, −A, −D,}
{c, h, m, r, w, B, 0, −B, −w, −r, −m, −h, −c, −c, −h, −m, −r, −w, −B, 0, B, w, r, m, h, c, c, h, m, r, w, B,}
{d, k, r, y, F, −A, −t, −m, −f, −b, −i, −p, −w, −D, C, v, o, h, a, g, n, u, B, −E, −x, −q, −j, −c, −e, −l, −s, −z,}
{e, n, w, F, −y, −p, −g, −c, −l, −u, −D, A, r, i, a, j, s, B, −C, −t, −k, −b, −h, −q, −z, E, v, m, d, f, o, x,}
{f, q, B, −A, −p, −e, −g, −r, −C, z, o, d, h, s, D, −y, −n, −c, −i, −t, −E, x, m, b, j, u, F, −w, −l, −a, −k, −v,}
{g, t, 0, −t, −g, −g, −t, 0, t, g, g, t, 0, −t, −g, −g, −t, 0, t, g, g, t, 0, −t, −g, −g, −t, 0, t, g, g, t,}
{h, w, −B, −m, −c, −r, 0, r, c, m, B, −w, −h, −h, −w, B, m, c, r, 0, −r, −c, −m, −B, w, h, h, w, −B, −m, −c, −r,}
{i, z, −w, −f, −l, −C, t, c, o, F, −q, −a, −r, E, n, d, u, −B, −k, −g, −x, y, h, j, A, −v, −e, −m, −D, s, b, p,}
{j, C, −r, −b, −u, z, g, m, F, −o, −e, −x, w, d, p, −E, −l, −h, −A, t, a, s, −B, −i, −k, −D, q, c, v, −y, −f, −n,}
{k, F, −m, −i, −D, o, g, B, −q, −e, −z, s, c, x, −u, −a, −v, w, b, t, −y, −d, −r, A, f, p, −C, −h, −n, E, j, l,}
{l, −E, −h, −p, A, d, t, −w, −a, −x, s, e, B, −o, −i, −F, k, m, −D, −g, −q, z, c, u, −v, −b, −y, r, f, C, −n, −j,}
{m, −B, −c, −w, r, h, 0, −h, −r, w, c, B, −m, −m, B, c, w, −r, −h, 0, h, r, −w, −c, −B, m, m, −B, −c, −w, r, h,}
{n, −y, −c, −D, i, s, −t, −h, E, d, x, −o, −m, z, b, C, −j, −r, u, g, −F, −e, −w, p, l, −A, −a, −B, k, q, −v, −f,}
{o, −v, −h, C, a, D, −g, −w, n, p, −u, B, b, E, −f, −x, m, q, −t, −j, A, c, F, −e, −y, l, r, −s, −k, z, d,}
{p, −s, −m, v, j, −y, −g, B, d, −E, −a, −F, c, C, −f, −z, i, w, −l, −t, o, q, −r, −n, u, k, −x, −h, A, e, −D, −b,}
{q, −p, −r, o, s, −n, −t, m, u, −l, −v, k, w, −j, −x, i, y, −h, −z, g, A, −f, −B, e, C, −d, −D, c, E, −b, −F, a,}
{r, −m, −w, h, B, −c, 0, c, −B, −h, w, m, −r, −r, m, w, −h, −B, c, 0, −c, B, h, −w, −m, r, r, −m, −w, h, B, −c}
{s, −j, −B, a, −C, t, r, −k, −A, b, −D, −h, q, −l, −z, c, −E, −g, v, p, −m, −y, d, −F, −f, w, o, −n, −x, e, 1}
{t, −g, 0, g, −t, −t, g, 0, −g, t, t, −g, 0, g, −t, −t, g, 0, −g, t, t, −g, 0, g, −t, −t, g, 0, −g, t, t, −g,}
{u, −d, B, n, −k, −E, g, −r, −x, a, −y, −q, h, −F, o, A, −c, v, t, −e, C, m, −l, −D, f, −s, −w, b, −z, −p, i}
{v, −a, w, u, −b, x, t, −c, y, s, −d, z, r, −e, A, q, −f, B, p, −g, C, o, −h, D, n, E, m, −j, F, l, −k,}
{w, −c, r, B, −h, m, 0, −m, h, −B, −r, c, −w, −w, c, −r, −B, h, −m, 0, m, −h, B, r, −c, w, w, −c, r, B, −h, m,}
{x, −f, m, −E, −q, b, −t, −B, j, −i, A, u, −c, p, F, −n, e, −w, −y, g, −l, D, r, −a, s, C, −k, h, −z, −v, d, −o,}
{y, h, −x, −z, j, −g, w, A, −k, f, −v, −B, l, −e, u, C, −m, d, −t, −D, n, −c, s, E, −o, b, −r, −F, p, −a, q,}
{z, −l, c, −q, E, u, −g, h, −v, −D, p, −b, m, −A, −y, k, −d, r, −F, −t, f, w, C, −o, a, −n, B, x, −j, e, −s,}
{A, −o, c, −j, v, F, −t, h, −e, q, −C, −y, m, −a, l, −x, −D, r, −f, g, −s, E, w, −k, b, −n, z, B, −p, d, u,}
{B, −r, h, −c, m, −w, 0, w, −m, c, −h, r, −B, −B, r, −h, c, −m, w, 0, −w, m, −c, h, −r, B, B, −r, h, −c, m, −w,}
{C, −u, m, −e, d, −l, t, −B, −D, v, −n, f, −c, k, −s, A, E, −w, o, −g, b, −j, r, −z, −F, x, −p, h, −a, −q, y,}
{D, −x, r, −l, f, −a, g, −m, s, −y, E, C, −w, q, −k, e, −b, h, −n, t, −z, F, B, −v, p, −j, d, −c, i, −o, u, −A,}
{E, −A, w, −s, o, −k, g, −c, b, −f, j, −n, r, −v, z, −D, −F, B, −x, t, −p, l, −h, d, −a, e, −m, −q, u, −y, C,}
{F, −D, B, −z, x, −v, t, −r, p, −n, l, −j, h, −f, d, −b, a, −c, e, −g, i, −k, m, −o, q, −s, u, −w, y, −A, C, −E,}
where {a, b, c, d, e, f, g, h, i, j, k, 1, m, n, o, p, q, r, s, t, u, v, w, x, y, z, A, B, C, D, E, F}={90, 90, 89, 88, 88, 86, 85, 84, 82, 80, 78, 77, 74, 72, 68, 66, 63, 60, 56, 53, 50, 45, 42, 38, 34, 30, 26, 21, 17, 13, 9, 4}

In VVC, for chroma components, MTS is not applied and only DCT-2 is used. In addition, for chroma component, the transform size include 2-pt, 4-pt, 8-pt, 16-pt and 32-pt.

In VVC, when both the height and width of the coding block is smaller than or equal to 64, the transform size is always the same as the coding block size. When either the height or width of the coding block is larger than 64, when doing the transform or intra prediction, the coding block is further split into multiple sub-blocks, where the width and height of each sub-block is smaller than or equal to 64, and one transform is performed on each sub-block.

For example, in U.S. Provisional Application No. 62/731, 773, which is incorporated by reference in its entirety, and proposal JVET-L0289 "CE6-related: Unification of Transform Skip mode and MTS", an identity transform scheme is used to harmonize transform skip and MTS.

An N-point identity transform (IDT) is a linear transform process using an N×N transform core which has only non-zero coefficient along the diagonal positions, the diagonal positions refer to positions having equal horizontal and vertical coordinate values.

In JVET-L0289, it is proposed to replace 4-point DCT-8 by 4-point IDT, and merge the syntaxes of TS mode into MTS. The 4-point IDT utilize the following transform core to be in line with the current 10-bit transform implementation. However, the 8-bit transform core is also straightforward to implement, which is simply replacing 512 by 128.

{512 0 0 0}
{0 512 0 0}
{0 0 512 0}
{0 0 0 512}

It is noted that the above 4-point IDT can be implemented by only 4 shift operations. With the proposed method, quantization is unified to that of MTS. The proposed IDT is only applied for luma component Multi-hypothesis intra-inter prediction (or namely intra-inter prediction mode) combines one intra prediction and one merge indexed prediction, namely intra-inter prediction mode. In a merge CU, one flag is signaled for merge mode to select an intra mode from an intra candidate list when the flag is true. For luma component, the intra candidate list is derived from 4 intra prediction modes including DC, planar, horizontal, and vertical modes, and the size of the intra candidate list can be 3 or 4 depending on the block shape. When the CU width is larger than the double of CU height, horizontal mode is removed from the intra mode list and when the CU height is larger than the double of CU width, vertical mode is removed from the intra mode list. One intra prediction mode selected by the intra mode index and one merge indexed prediction selected by the merge index are combined using weighted average. For chroma component, DM is always applied without extra signaling.

The weights for combining predictions are described as follows. When DC or planar mode is selected or the Coding Block (CB) width or height is smaller than 4, equal weights are applied. For those CBs with CB width and height larger than or equal to 4, when horizontal/vertical mode is selected, one CB is first vertically/horizontally split into four equal-area regions. Each weight set, denoted as (w_intrai, w_interi), where i is from 1 to 4 and (w_intra1, w_inter1)=(6, 2), (w_intra2, w_inter2)=(5, 3), (w_intra3, w_inter3)=(3, 5), and (w_intra4, w_inter4)=(2, 6), will be applied to a corresponding region. (w_intra1, w_inter 1) is for the region closest to the reference samples and (w_intra4, w_inter4) is for the region farthest away from the reference samples. Then, the combined prediction can be calculated by summing up the two weighted predictions and right-shifting 3 bits. Moreover, the intra prediction mode for the intra hypothesis of predictors can be saved for the intra mode coding of the following neighboring CBs if they are intra coded.

However, in the VVC, MTS can be applied up to 32×32 block, which uses up to 32-point DST-7/DCT-8. Since there is no efficient DST-7/DCT-8 methods for larger sizes in terms of hardware implementation cost, full matrix multiplication is still used for 8-point, 16-point and 32-point DST-7/DCT-8, which is also high cost for hardware implementation, and the worst case may be four 32×32 DST-7/DCT-8 transforms applied within one 64×64 transform unit. Transform Skip mode can be applied for both luma and chroma. Additionally, in JVET-L0289, the IDT is only applied on luma component, so the functionality of skipping transform on chroma component is lost, and MTS is only applied for luma component, it can be also extended for chroma comoponent and work together with IDT to enable the transform skipping for both luma and chroma components in a harmonized way.

Therefore, there is a desire for a technical solution to such problems.

SUMMARY

There is included a method and apparatus comprising memory configured to store computer program code and a hardware processor or processors configured to access the computer program code and operate as instructed by the computer program code. The computer program includes determining code, configured to cause the processor to determine whether at least one parameter of a block is less than or equal to a threshold, signaling code, configured to cause the processor to signal in response to determining the at least one parameter of the block is less than or equal to the threshold one of a horizontal transform and a vertical transform, splitting code, configured to cause the processor to split in response to determining that the at least one parameter of the block is greater than the threshold the block into sub-blocks, applying code configured to cause the processor to apply a first signaling scheme on a luma component and a second signaling scheme on a chroma component, transforming code configured to cause the processor to perform ones of transforms on the sub-blocks, decoding code configured to cause the processor to perform decoding of a video stream by using the sub-blocks upon which the ones of the transforms are performed, and where a maximum block size of the first signaling scheme is different than a maximum block size of the second signaling scheme. The transforms including any of a primary transform, a horizontal transform, a vertical transform, an enhanced multiple transform, an adaptive multiple transform, a spatially varying transform, a sub-block transform, an identity trnsform According to exemplary embodiments, the program code further includes signaling code such that the at least one of the horizontal transform and the vertical transform is further in response to determining whether at least one signaled transform type selected from multiple candidate transform types is absent symmetry/anti-symmetry characteristics, where the at least one signaled transform type is at least one of a discrete cosine transform (DCT)-4, a DCT-5, a DCT-6, a DCT-7, a DCT-8, a discrete sine transform (DST)-4, a DST-5, a DST-6, a DST-7, and a DST-8, and where a DCT-1, a DCT-2, a DCT-3, a DST-1, a DST-2, and a DST-3 comprise the symmetry/anti-symmetry characteristics.

According to exemplary embodiments, the signaling code is further configured to cause the processor to signal the at least one of the horizontal transform and the vertical transform further in response to determining whether at least one signaled transform type selected from multiple candidate transform types is other than a recursive transform.

According to exemplary embodiments, the signaling code is further configured to cause the processor to signal the one of the horizontal transform and the vertical transform comprises signaling a vertical transform selection before signaling a horizontal transform selection.

According to exemplary embodiments, wherein the threshold is that the parameter is at least one of a width and a height of the block having an integer less than or equal to 16.

According to exemplary embodiments, the splitting code is further configured to cause the processor to split the block into the sub-blocks by determining different transform types respective to ones of the sub-blocks depending on relative locations of the ones of the sub-blocks with the block.

According to exemplary embodiments, the signaling code is further configured to cause the processor to signal, in response to splitting the block into the sub-blocks, ones of individual transform indices for each of the sub-blocks respectively, where each of the transform indices specify ones of transform selections.

According to exemplary embodiments, the signaling code is further configured to cause the processor to signal, in response to splitting the block into the sub-blocks, a transform index as shared by a plurality of the sub-blocks respectively.

According to exemplary embodiments, wherein the maximum block size of the second signaling scheme is one of 2, 4, 8, and 16.

According to exemplary embodiments, the program code further comprises using code configured to cause the processor to use a transform selection on a luma component, and re-using code configured to cause the processor to re-use, in response to determining that the luma component shares a block partitioning tree with a chroma component co-located with the luma component, the transform selection of a luma component on the chroma component.

BRIEF DESCRIPTION OF THE DRAWINGS

Further features, nature, and various advantages of the disclosed subject matter will be more apparent from the following detailed description and the accompanying drawings in which:

FIGS. 1-10 are schematic illustrations of diagrams in accordance with embodiments.

DETAILED DESCRIPTION

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium. In the present disclosure, most probable mode (MPM) can refer to a primary MPM, a secondary MPM, or both a primary and a secondary MPM.

Figure 1:
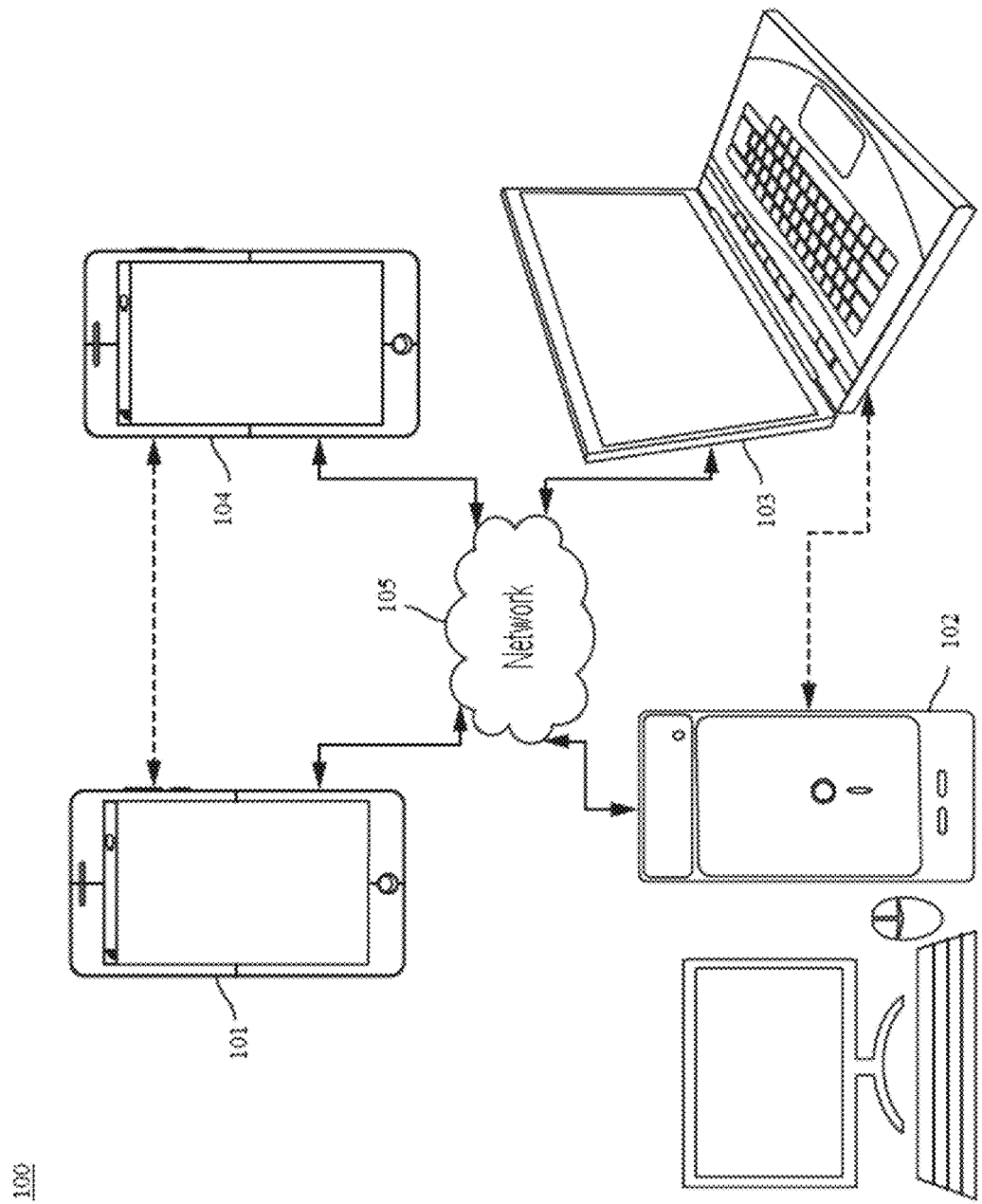

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
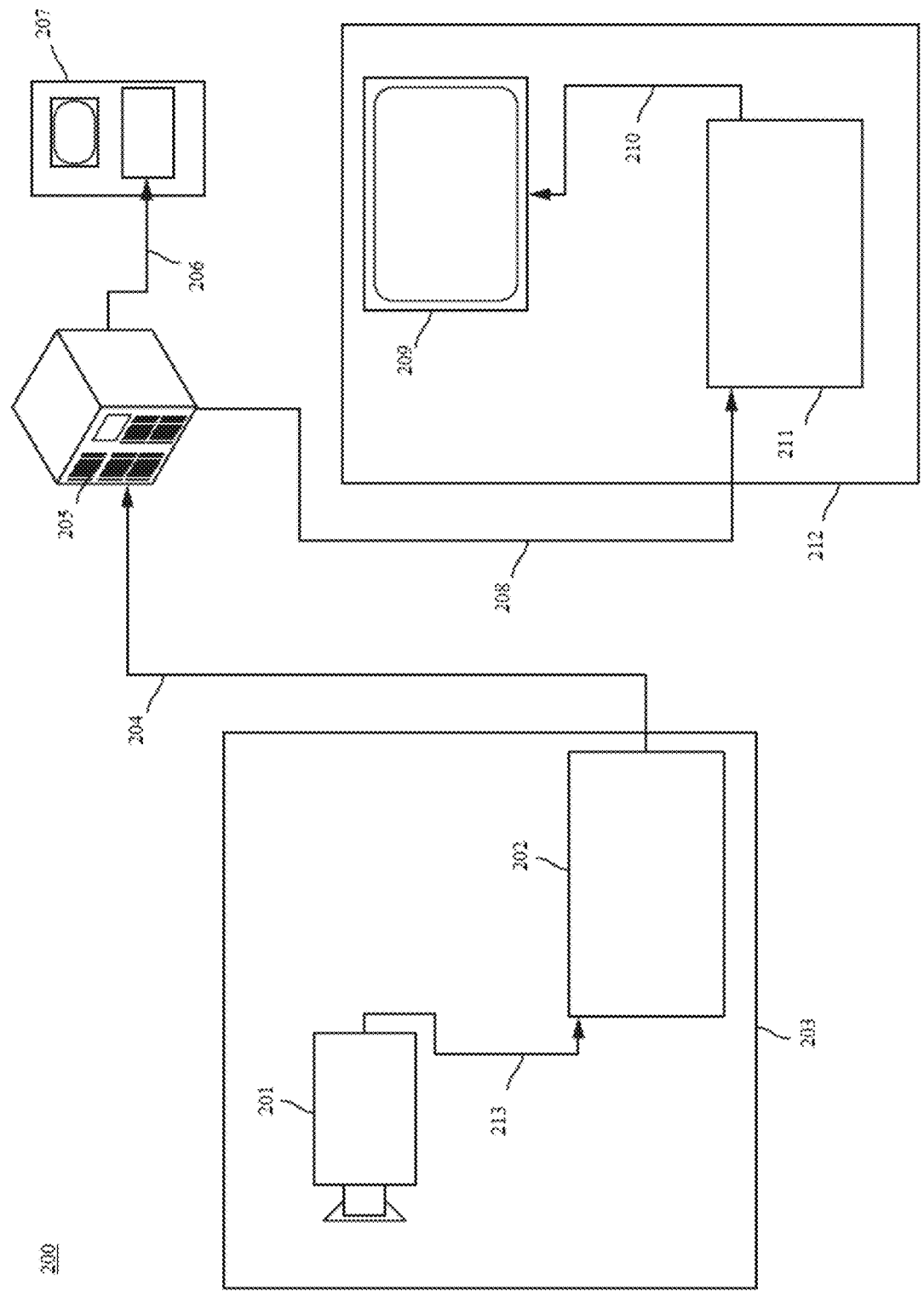

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213, depicted as a bold line to emphasize a high data volume when compared to encoded video bitstreams, can be processed by an encoder 202 coupled to the camera 201. The encoder 202 can include hardware, software, or a combination thereof to enable or implement aspects of the disclosed subject matter as described in more detail below. The encoded video bitstream 204, depicted as a thin line to emphasize the lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

Figure 3:
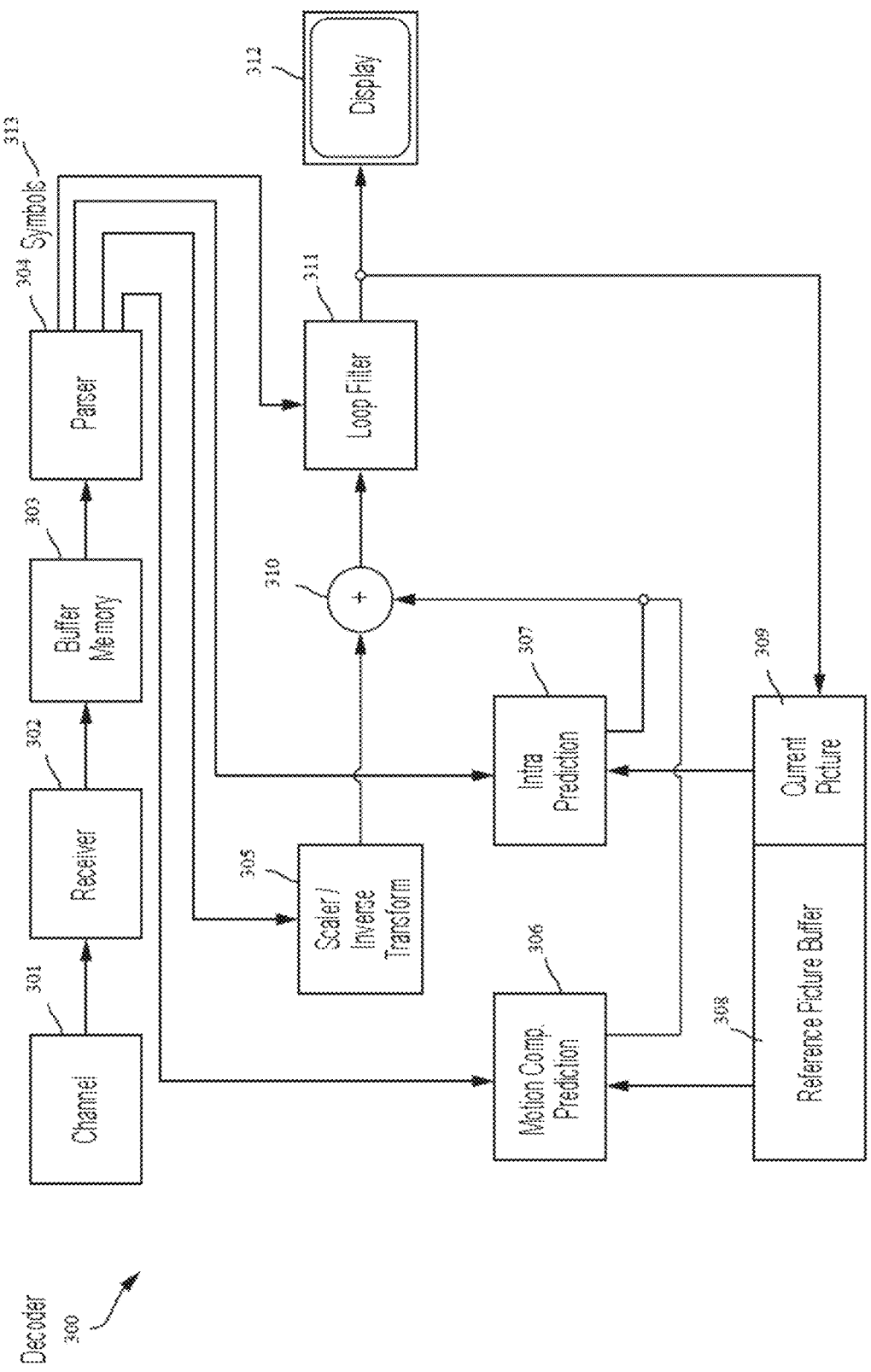

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosynchronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information (VUI) parameter set fragments (not depicted). The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 200 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 4:
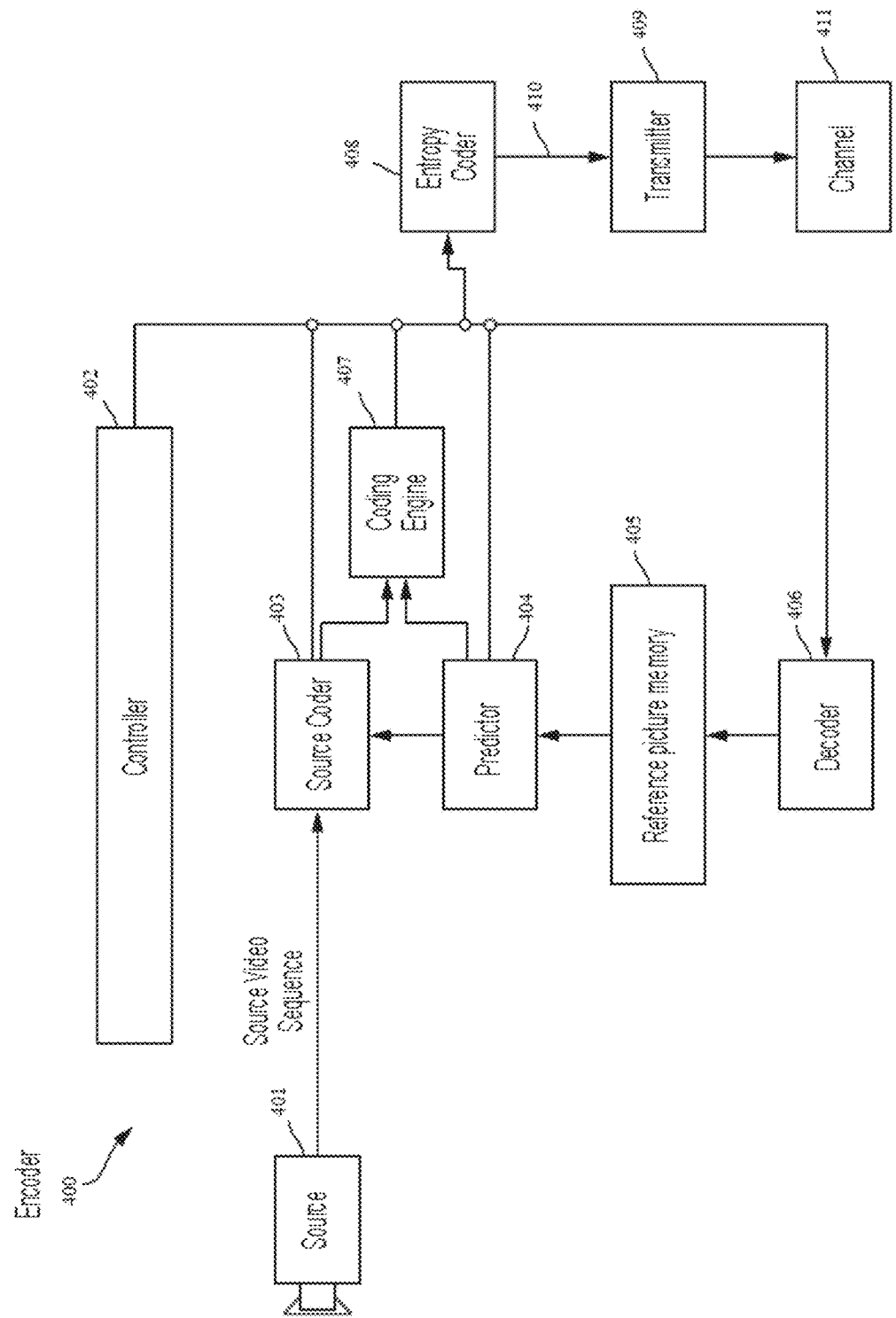

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder (303) in the form of a digital video sample stream that can be of any suitable bit depth (for example: 8 bit, 10 bit, 12 bit, . . . ), any colorspace (for example, (Binary Tree (BT)) BT.601 Y CrCB, RGB, . . . ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 402 as they may pertain to video encoder 400 optimized for a certain system design.

Some video encoders operate in what a person skilled in the art readily recognizes as a "coding loop." As an oversimplified description, a coding loop can consist of the encoding part of an encoder 402 ("source coder" henceforth) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 can be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 can be lossless, the entropy decoding parts of decoder 300, including channel 301, receiver 302, buffer 303, and parser 304 may not be fully implemented in local decoder 406.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder (not shown in FIG. 4), the reconstructed video sequence typically may be a replica of the source video sequence with some errors. The local video decoder 406 replicates decoding processes that may be performed by the video decoder on reference frames and may cause reconstructed reference frames to be stored in the reference picture cache 405. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the video coder 403, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence(s) as created by the entropy coder 408 to prepare it for transmission via a communication channel 411, which may be a hardware/software link to a storage device which would store the encoded video data. The transmitter 409 may merge coded video data from the video coder 403 with other data to be transmitted, for example, coded audio data and/or ancillary data streams (sources not shown).

The controller 402 may manage operation of the encoder 400. During coding, the controller 405 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 400 may perform coding operations according to a predetermined video coding technology or standard, such as ITU-T Rec. H.265. In its operation, the video coder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The video coder 403 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

FIG. 5 illustrates intra prediction modes used in HEVC and JEM. To capture the arbitrary edge directions presented in natural video, the number of directional intra modes is extended from 33, as used in HEVC, to 65. The additional directional modes in JEM on top of HEVC are depicted as dotted arrows in FIG. 1(*b*), and the planar and DC modes remain the same. These denser directional intra prediction modes apply for all block sizes and for both luma and chroma intra predictions. As shown in FIG. 5, the directional intra prediction modes as identified by dotted arrows, which is associated with an odd intra prediction mode index, are called odd intra prediction modes. The directional intra prediction modes as identified by solid arrows, which are associated with an even intra prediction mode index, are called even intra prediction modes. In this document, the directional intra prediction modes, as indicated by solid or dotted arrows in FIG. 5 are also referred as angular modes.

In JEM, a total of 67 intra prediction modes are used for luma intra prediction. To code an intra mode, an MPM list of size 6 is built based on the intra modes of the neighboring blocks. If intra mode is not from the MPM list, a flag is signaled to indicate whether intra mode belongs to the selected modes. In JEM-3.0, there are 16 selected modes, which are chosen uniformly as every fourth angular mode. In JVET-D0114 and JVET-G0060, 16 secondary MPMs are derived to replace the uniformly selected modes.

Figure 6:
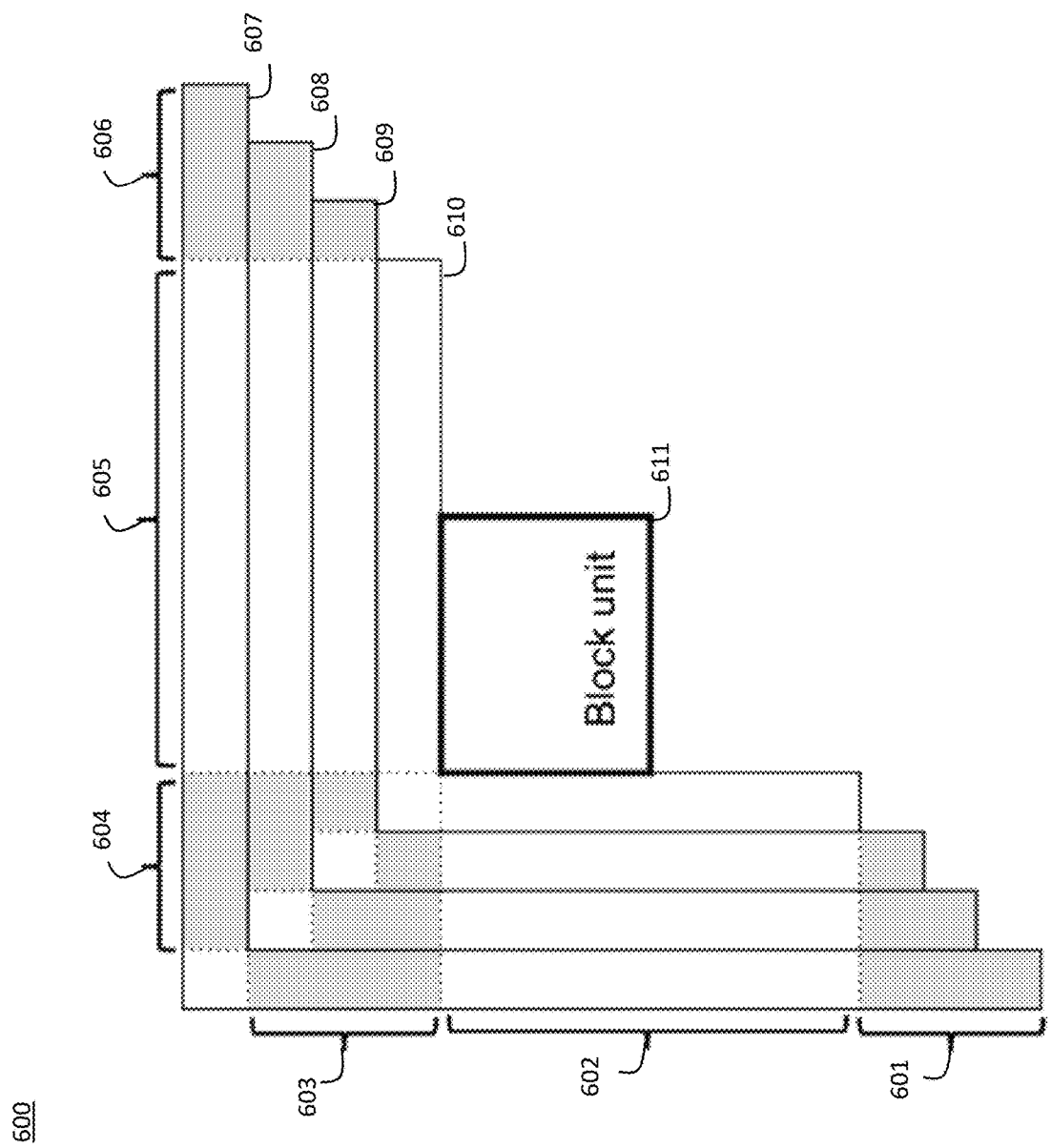

FIG. 6 illustrates N reference tiers exploited for intra directional modes. There is a block unit 611, a segment A 601, a segment B 602, a segment C 603, a segment D 604, a segment E 605, a segment F 606, a first reference tier 610, a second reference tier 209, a third reference tier 608 and a fourth reference tier 607.

In both HEVC and JEM, as well as some other standards such as H.264/AVC, the reference samples used for predicting the current block are restricted to a nearest reference line (row or column). In the method of multiple reference line intra prediction, the number of candidate reference lines (row or columns) are increased from one (i.e. the nearest) to N for the intra directional modes, where N is an integer greater than or equal to one. FIG. 2 takes 4×4 prediction unit (PU) as an example to show the concept of the multiple line intra directional prediction method. An intra-directional mode could arbitrarily choose one of N reference tiers to generate the predictors. In other words, the predictor p(x,y) is generated from one of the reference samples S1, S2, . . . , and SN. A flag is signaled to indicate which reference tier is chosen for an intra-directional mode. If N is set as 1, the intra directional prediction method is the same as the traditional method in JEM 2.0. In FIG. 6, the reference lines 610, 609, 608 and 607 are composed of six segments 601, 602, 603, 604, 605 and 606 together with the top-left reference sample. In this document, a reference tier is also called a reference line. The coordinate of the top-left pixel within current block unit is (0,0) and the top left pixel in the 1st reference line is (−1,−1).

In JEM, for the luma component, the neighboring samples used for intra prediction sample generations are filtered before the generation process. The filtering is controlled by the given intra prediction mode and transform block size. If the intra prediction mode is DC or the transform block size is equal to 4×4, neighboring samples are not filtered. If the distance between the given intra prediction mode and vertical mode (or horizontal mode) is larger than predefined threshold, the filtering process is enabled. For neighboring sample filtering, [1, 2, 1] filter and bi-linear filters are used.

A position dependent intra prediction combination (PDPC) method is an intra prediction method which invokes a combination of the un-filtered boundary reference samples and HEVC style intra prediction with filtered boundary reference samples. Each prediction sample pred[x][y] located at (x, y) is calculated as follows:

$$\text{pred}[x][y]=(wL*R_{-1,y}+wT*R_{x,-1}+wTL*R_{-1,-1}+(64-wL-wT-wTL)*\text{pred}[x][y]+32)>>6 \quad \text{(Eq. 2-1)}$$

where $R_{x,-1}, R_{-1,y}$ represent the unfiltered reference samples located at top and left of current sample (x, y), respectively, and $R_{-1,-1}$ represents the unfiltered reference sample located at the top-left corner of the current block. The weightings are calculated as below, $$wT=32>>((y<<-1)>>\text{shift}) \quad \text{(Eq. 2-2)}$$

$$wL=32>>((x<<-1)>>\text{shift}) \quad \text{(Eq. 2-3)}$$

$$wTL=-(wL>>4)-(wT>>4) \quad \text{(Eq. 2-4)}$$

$$\text{shift}=(\log 2(\text{width})+\log 2(\text{height})+2)>>2 \quad \text{(Eq. 2-5)}.$$

Figure 7:
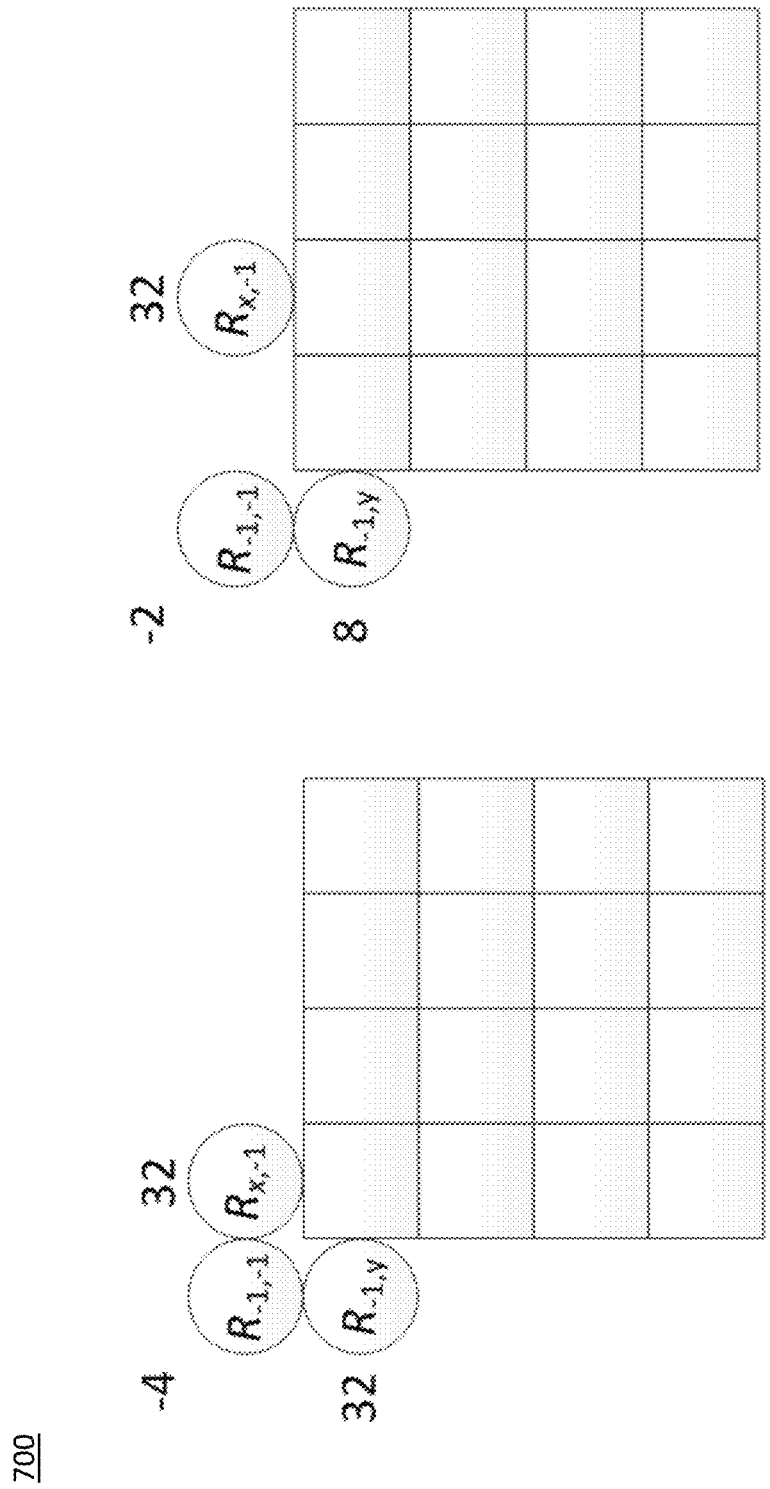

FIG. 7 illustrates a diagram 700 in which weightings (wL, wT, wTL) for (0, 0) and (1, 0) positions inside one 4×4 block are shown.

Figure 8:
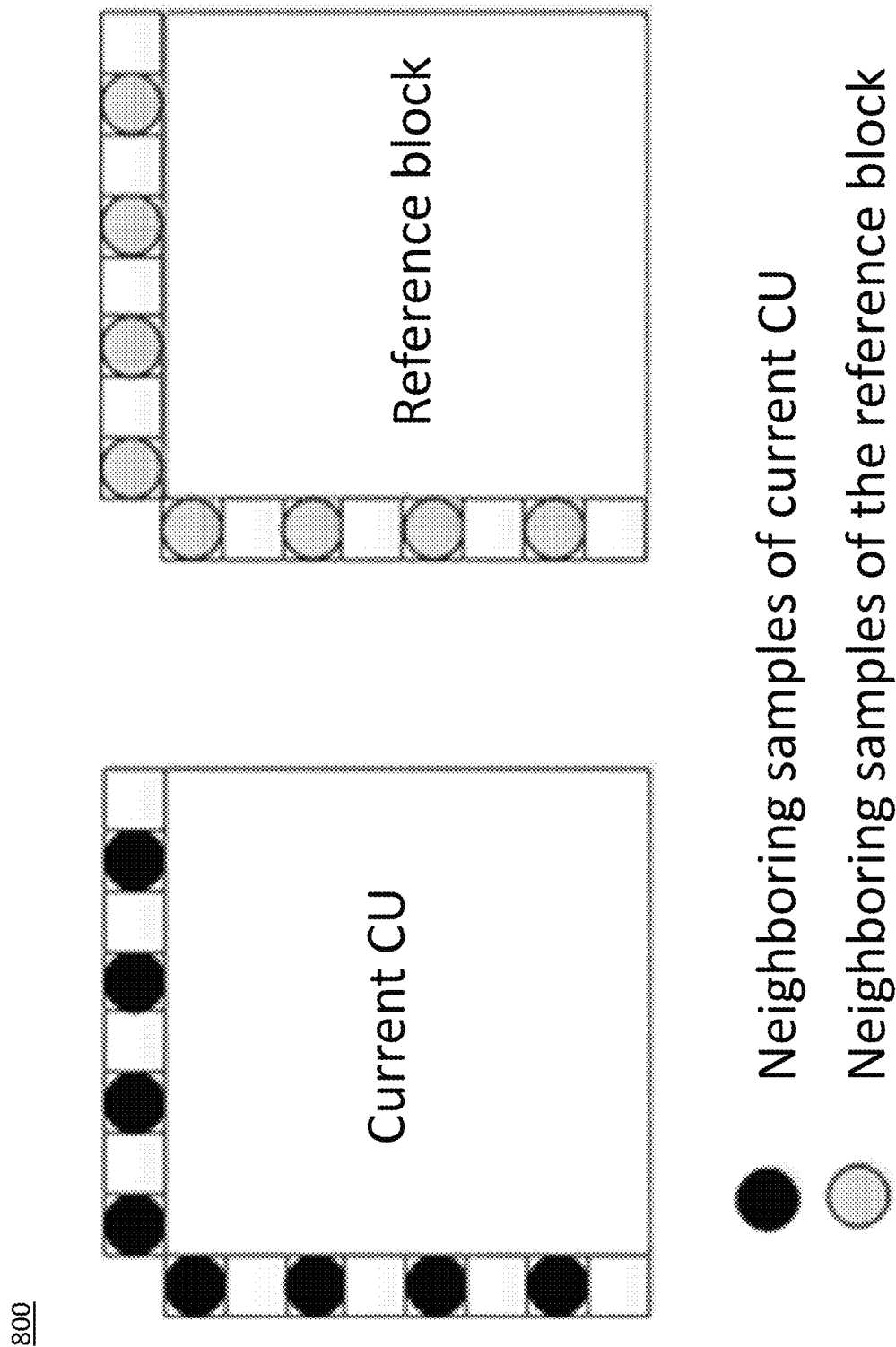

FIG. 8 illustrates a Local Illumination Compensation (LIC) diagram 800 and is based on a linear model for illumination changes, using a scaling factor a and an offset b. And it is enabled or disabled adaptively for each inter-mode coded coding unit (CU).

When LIC applies for a CU, a least square error method is employed to derive the parameters a and b by using the neighboring samples of the current CU and their corresponding reference samples. More specifically, as illustrated in FIG. 8, the subsampled (2:1 subsampling) neighboring samples of the CU and the corresponding samples (identified by motion information of the current CU or sub-CU) in the reference picture are used. The IC parameters are derived and applied for each prediction direction separately.

When a CU is coded with merge mode, the LIC flag is copied from neighboring blocks, in a way similar to motion information copy in merge mode; otherwise, an LIC flag is signaled for the CU to indicate whether LIC applies or not.

FIG. 9A illustrates illustrates an example 901 of block partitioning by using QTBT, and FIG. 9B illustrates the corresponding tree representation 901. The solid lines indicate quadtree splitting and dotted lines indicate binary tree splitting. In each splitting (i.e., non-leaf) node of the binary tree, one flag is signalled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

The QTBT structure removes the concepts of multiple partition types, i.e. it removes the separation of the CU, PU and TU concepts, and supports more flexibility for CU partition shapes. In the QTBT block structure, a CU can have either a square or rectangular shape. , a coding tree unit (CTU) is first partitioned by a quadtree structure. The quadtree leaf nodes are further partitioned by a binary tree structure. There are two splitting types, symmetric horizontal splitting and symmetric vertical splitting, in the binary tree splitting. The binary tree leaf nodes are called coding units (CUs), and that segmentation is used for prediction and transform processing without any further partitioning. This means that the CU, PU and TU have the same block size in the QTBT coding block structure. In VVC, a CU sometimes consists of coding blocks (CBs) of different color components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices.

The following parameters are defined for the QTBT partitioning scheme:
- CTU size: the root node size of a quadtree, the same concept as in HEVC,
- MinQTSize: the minimum allowed quadtree leaf node size,
- MaxBTSize: the maximum allowed binary tree root node size,
- MaxBTDepth: the maximum allowed binary tree depth, and
- MinBTSize: the minimum allowed binary tree leaf node size.

In one example of the QTBT partitioning structure, the CTU size is set as 128×128 luma samples with two corresponding 64×64 blocks of chroma samples, the MinQTSize, where QT is Quad Tree, is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64). Otherwise, the leaf quadtree node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

In addition, a QTBT scheme supports the ability for the luma and chroma to have a separate QTBT structure. Currently, for P and B slices, the luma and chroma coding tree blocks (CTBs) in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three color components.

Figure 10:
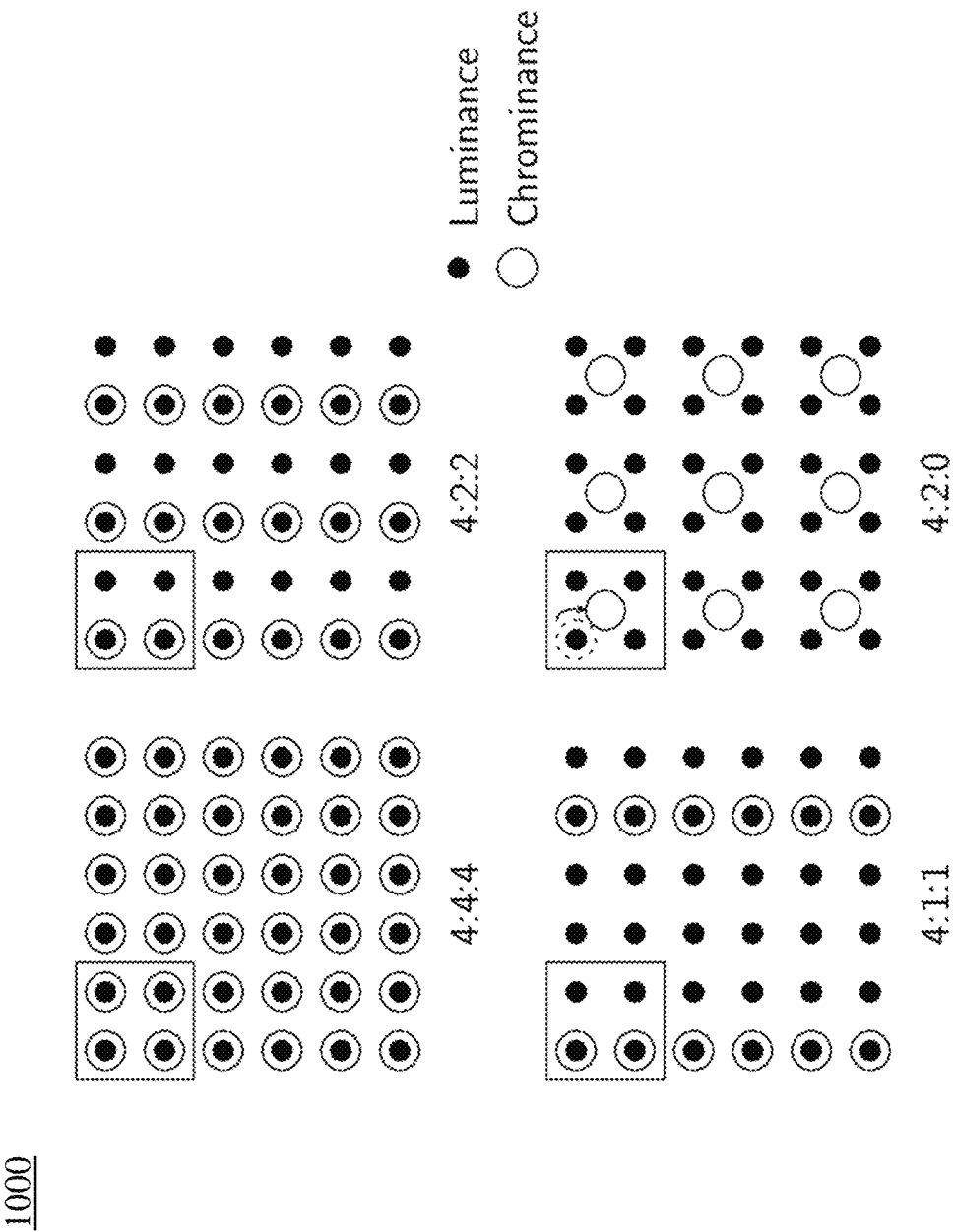
Figure 11:
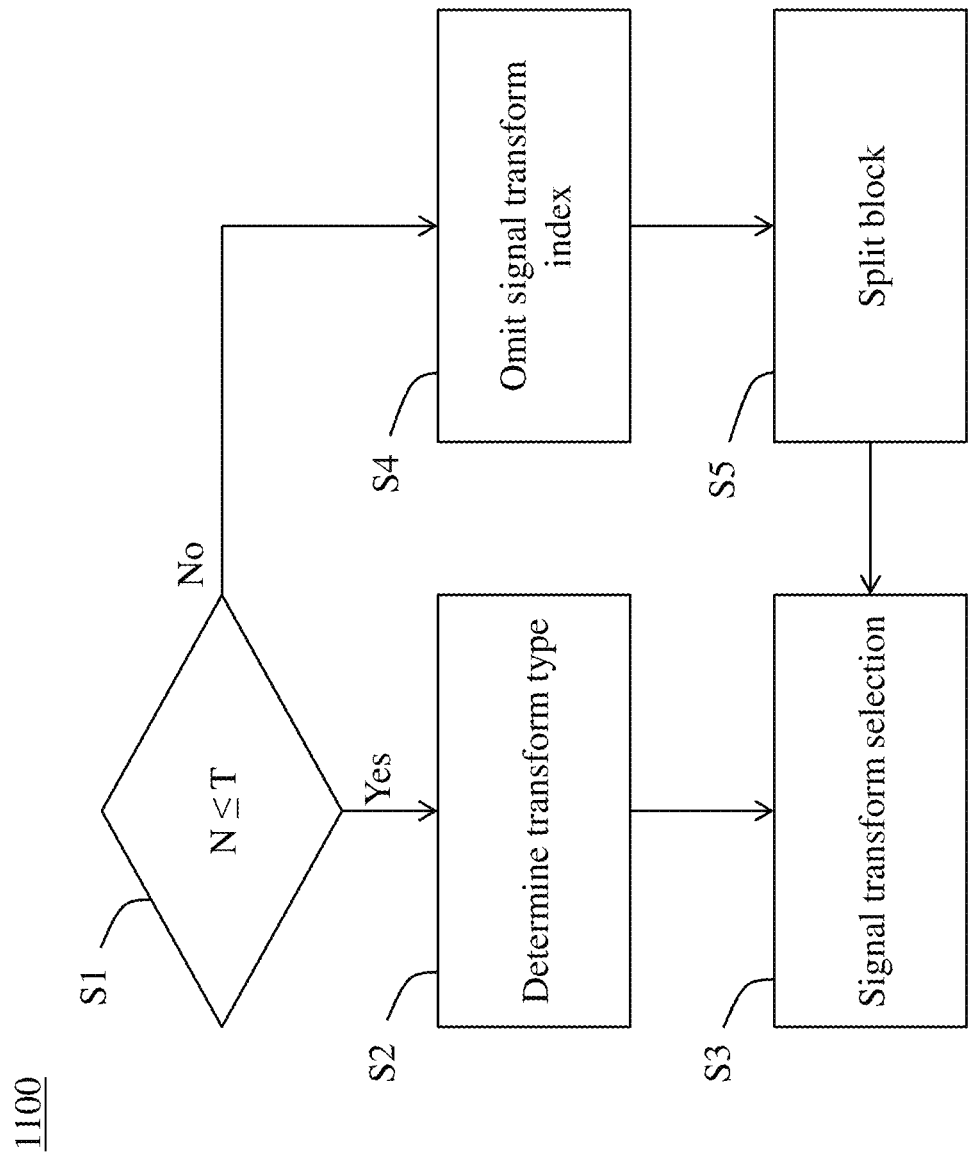
FIGS. 11-13 are simplified flow charts in accordance with embodiments.

FIG. 10 illustrates examples 1000 of different YUV formats. The typical YUV formats are described. With 4:4:4 format, the luma and chroma samples are aligned along both horizontal and vertical directions, and always located at the same coordinate. With 4:2:2 format, the luma and chroma samples are aligned along vertical direction, but the number of chroma samples is halved along the horizontal direction. With 4:2:2 format, the number of chroma samples is halved along both the horizontal and vertical directions, in addition, the chroma samples are located in a fractional position of luma samples grid FIG. 11 illustrates a flowchart 1100 according to exemplary embodiments. At S1, it is determined whether N, a parameter such as a block width or height, is less than or equal to a threshold T. Example values of the threshold T include any integer values less than or equal to 16, 32, or 64.

If at S1, it is determined that N is less than or equal to the threshold T, then at S2 it is determined whether at least one of a signaled transform type selected from multiple candidate transform types is not a specified type. For example, the specified type may be one having symmetry/anti-symmetry characteristics or may be a recursive transform.

According to exemplary embodiments, a transform type which does not have symmetry/anti-symmetry characteristics or may not be the recursive transform may be any of DCT-4, DCT-5, DCT-6, DCT-7, DCT-8, DST-4, DST-5, DST-6, DST-7, DST-8, and a transform type which does have symmetry/anti-symmetry characteristics or may be the recursive transform may be any of DCT-1, DCT-2, DCT-3, DST-1, DST-2, DST-3.

At S3, it has been determined at S2 that the at least one of the signaled transform type selected from multiple candidate transform types is not the specified type, a transform selection, such as a horizontal or a vertical transform selection is signaled. According to exemplary embodiments, the vertical transform selection is signaled before the horizontal transform selection.

If at S1, it is determined that N is not less than or equal to the threshold T, then at S4, signaling a transform index is omitted such as at least one of the horizontal transform selection and vertical transform selection is not signaled. According to other exemplary embodiments, the threshold T may be a block area size including any of 256, 512, 1024, 2048, and 4096.

At S5, as it has been determined that a block size referring to any of block width, block height, block area size, block width to height ratio, max (block width, block height), min (block width, block height) is larger than the threshold T, MTS may still be used, but, such as when MTS is applied (e.g., which mts flag is signaled as a default value which indicates MTS is enabled), the block is implicitly split into multiple smaller sub-blocks.

In an embodiment where block size refers to block width and/or height, example values of the threshold T include but are not limited to: 4, 8, 16, 32, 64, and 128.

In an embodiment where the block size refers to the block area size, example values of the threshold T include but are not limited to: 64, 128, 256, 512, 1024, 4096, 8192, and 16384.

At S5, the sub-block size may be limited to be less than or equal to a maximum allowed transform size used in MTS. According to exemplary embodiments, if the maximum allowed transform size of the transform type used in MTS is N-point, then the block is split into multiples of min(W, N)×min(H, N) sub-blocks. Example values of N include but not limited to: 4, 8, 16, 32, 64, 128. For example, if the threshold value of N is 16, then for a 64×32 block, the block is split into eight 16×16 sub-blocks, for an 8×32 block, the block is split into two 8×16 sub-blocks.

After splitting the block into the multiple sub-blocks from S5 to S3 according to exemplary embodiments, an individual transform index, such as mts_idx, is signaled for each sub-block to specify the transform selection. Alternatively, a single one of the individual transform index may be signaled and shared for each of the sub-blocks.

Also, after splitting the block into the multiple sub-blocks from S5 to S3, different transform types may be applied for each sub-block depending on the sub-block's relative location within the current block from which the sub-blocks are split. According to exemplary embodiments, if the block is located within the left half part of the block, DCT-8 or DCT-4 is used as the horizontal transform; if the block is located within the right half part of the block, DST-7 or DST-4 is used as the horizontal transform; if the block is located within the top half part of the block, DCT-8 or DCT-4 is used as the vertical transform; and/or if the block is located within the bottom half part of the block, DST-7 or DST-4 is used as the vertical transform.

According to exemplary embodiments, after splitting the block into the multiple sub-blocks from S5 to S3, the transform selection for each sub-block is still signaled but the transform set applied for each sub-block may be dependent on the relative location of the sub-block within the current block because probabilities may be different depending on those locations.

For example, the available horizontal transform types for a sub-block located in the left half part and right half part of the current block are associated with different transform index values; for a sub-block located in the left half part of the current block, the transform types for selecting the horizontal transform includes {mts_hor_flag=0: DST-7, mts_hor_flag=1: DCT-8}, while for a sub-block located in the right half part of the current block, the transform types for selecting the horizontal transform includes {mts_hor_flag=0: DCT-8, mts_hor_flag=1: DST-7}.

In another example, the available vertical transform types for a sub-block located in the top half part and bottom half part of the current block are associated with different transform index values. For example, for a sub-block located in the top half part of the current block, the transform types for selecting the vertical transform includes {mts_ver_flag=0: DST-7, mts_ver_flag=1: DCT-8}, while for a sub-block located the bottom half part of the current block, the transform types for selecting the vertical transform includes {mts_ver_flag=0: DCT-8, mts_ver_flag=1: DST-7}.

Further, from S5 to S3 according to embodiments, the transform selection for each sub-block is still signaled but the context for signaling the horizontal transform (mts_hor_flag) and vertical transform (mts_ver_flag) may depend on the relative location of the sub-block within the current block.

Additionally, with the above-embodiments, for a small transform size, DST-4 may be used instead of DST-7, and DCT-4 may be used instead of DCT-8. The small transform size may include, but is not limited to, 4-point and 8-point, or it includes 4-point, 8-point and 16-point.

Figure 12:
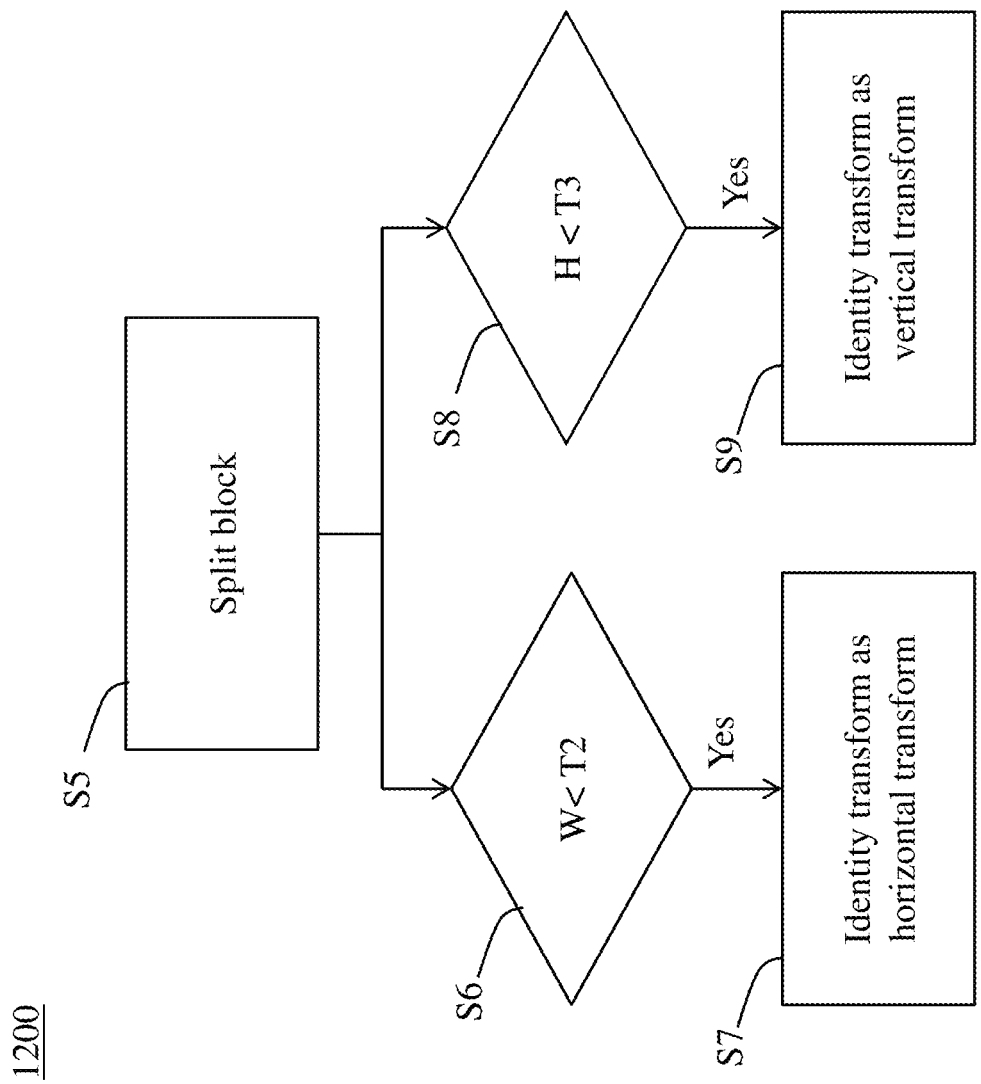

FIG. 12 also illustrates flowchart 1200 where additional features are described for S5 according to exemplary embodiments.

At S6, it is determined whether the width of the sub-blocks is less than a given threshold T2, and if so, at S7, an identity transform (IDT) can be applied as the horizontal transform.

Also, at S8, it is determined whether the height of the sub-blocks is less than a given threshold T3, and if so, an identity transform can be applied as the vertical transform.

According to embodiments with respect to FIG. 2, an N-point IDT is a linear transform process using an N×N transform core which has only non-zero coefficient along the diagonal positions, the diagonal positions refer to positions having equal horizontal and vertical coordinate values. An example of IDT transform core is an N×N matrix with only nonzero elements at the diagonal positions, and the nonzero elements have equal value 512. An example value of the threshold values T2 and T3 include, but are not limited to, any of 4, 8, 16 and 32. Also, when IDT can be used, it may be used jointly with another transform type, e.g., DST-4, DST-7, DCT-4, DCT-8, and the selection is signaled using the horizontal transform selection flag (mts_hor_flag) and/or vertical transform selection flag (mts_ver_flag). Also, when IDT can be used, a transform selection may not be signaled, and only IDT may be used.

Figure 13:
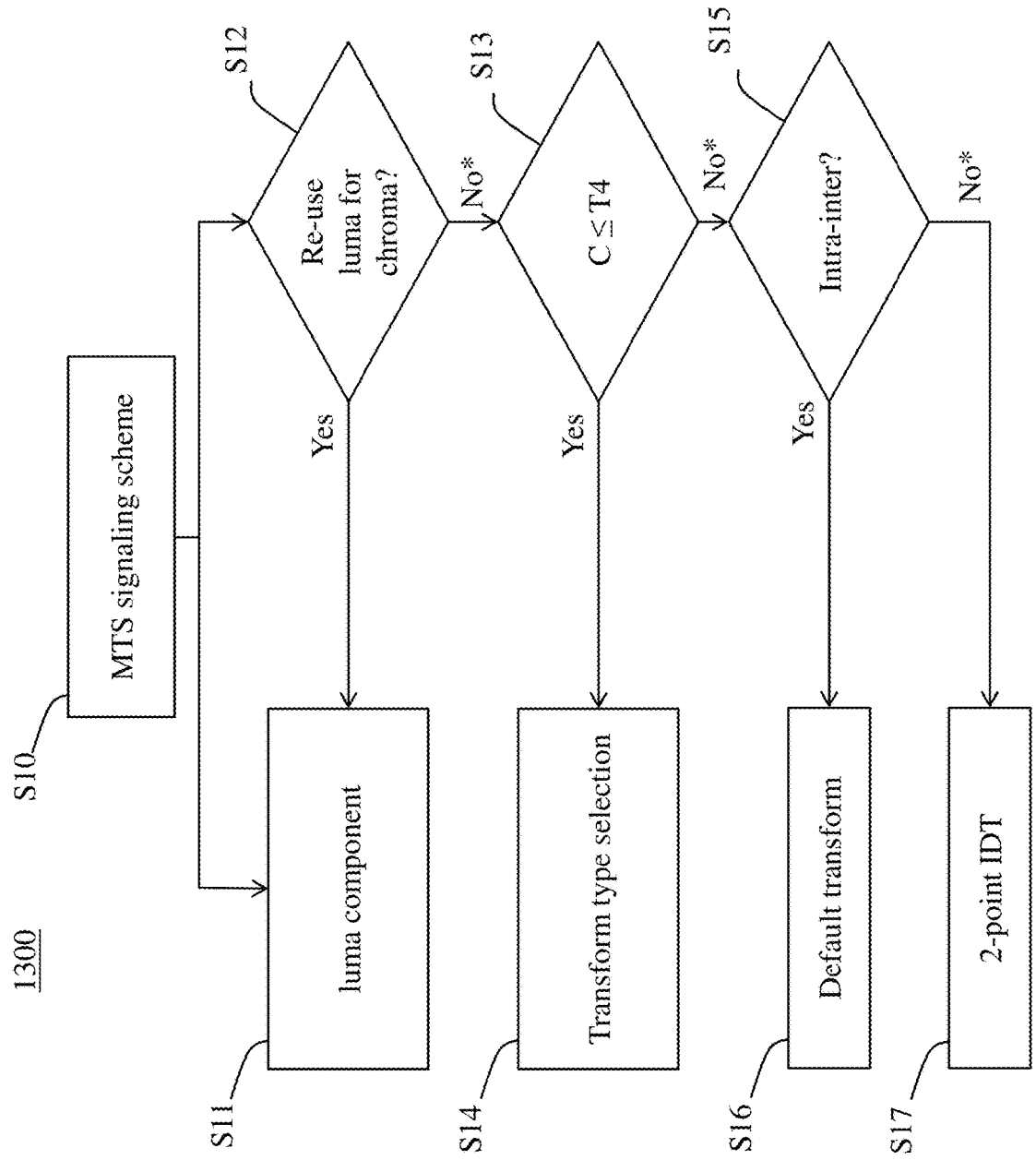

FIG. 13 illustrates a flowchart 1300 for an MTS signaling scheme S10 in which the scheme applied on a luma component may also be applied on a chroma component. However, with this flowchart 300, a maximum block size which supports MTS can be different between luma and chroma components.

At S11, an MTS signaling scheme is applied on a luma component, and at S12 it is determined whether to re-use the luma component MTS signaling scheme for a co-located, in a block or sub-block, component with some restrictions.

At S12, if it is determined to re-use the luma component MTS signaling scheme, then it may be determined that when luma and chroma share the block partitioning tree, the following table is used to select the chroma horizontal and vertical transform type:

| Luma Transform size | Transform type used for co-located luma block | Transform type used for co-located chroma block |
| --- | --- | --- |
| 4-point | DST-7 | DCT-2 |
| | DCT-8 | DCT-2 |
| | DCT-2 | DCT-2 |
| | IDT | DCT-2 |
| Greater than 4-point | DST-7 | DST-7 |
| | DCT-8 | DCT-8 |
| | DCT-2 | DCT-2 |

According to exemplary embodiments at S12, if it is determined to re-use the luma component MTS signaling scheme, then it may be determined that when when luma and chroma share the block partitioning tree, the following table is used to select the chroma horizontal and vertical transform type:

| Luma Transform size | Transform type used for co-located luma block | Transform type used for co-located chroma block |
| --- | --- | --- |
| 4-point | DST-7 | DCT-2 |
| | DCT-8 | DCT-2 |
| | DCT-2 | DCT-2 |
| | IDT | DCT-2 (can also be IDT) |
| 8-point | DST-7 | DST-7 |
| | DCT-8 | IDT |
| | DCT-2 | DCT-2 |
| Greater than 4-point | DST-7 | DST-7 |
| | DCT-8 | DCT-8 |
| | DCT-2 | DCT-2 |

According to exemplary embodiments at S12, if it is determined to re-use the luma component MTS signaling scheme and for YUV 4:4:4 chroma format, when luma and chroma share the block partitioning tree, the same horizontal and vertical transform type applied on co-located luma component may be re-used for the chroma component.

According to exemplary embodiments at S12, if it is determined to re-use the luma component MTS signaling scheme and for YUV 4:2:2 chroma format, when luma and chroma share the block partitioning tree, the same vertical transform type applied on co-located luma component is re-used for the chroma component, however, the horizontal transform type selection may be decided using the method with any of tables 1 and 2.

According to exemplary embodiments at S12, if it is determined to re-use the luma component MTS signaling scheme and for YUV 4:2:0 chroma format, when luma and chroma share the block partitioning tree, the horizontal and vertical transform type selection may be decided using the method with any of tables 1 and 2.

According to exemplary embodiments at S12, if it is determined to re-use the luma component MTS signaling scheme, the horizontal and/or vertical transform type selection may be different for different YUV formats.

According to exemplary embodiments at S12, if it is determined to re-use the luma component MTS signaling scheme, transform selection is only applied when chroma may be predicted using DM mode or inter prediction mode, or intra-inter prediction mode.

At S13, if S12 is "no" or regardless of S12, it is determined whether some value C of a chroma component is less than or equal to a threshold T4. Example chroma components may be any of a height of a chroma block, a width of a chroma block, a block size of the chroma block. Example thresholds T4 may be any of values including but not limited to 2, 4, 8, 16. Also, as described below, vertical and horizontal transform selections may have different threshold T4 values.

According to exemplary embodiments at S14, horizontal and vertical transform type selection and signaling may be applied for chroma blocks with both height and width smaller than or equal to a given threshold.

According to exemplary embodiments at S14, for small block sizes, a default transform type, e.g., DST-7 or DST-4, may always applied as both horizontal and vertical transform on chroma and transform selection (MTS) might not be used. Alternatively or according to other embodiments at S14, for small block sizes, two transform schemes are available, and the selection may be signaled such that the first transform scheme may apply an identity transform as both horizontal and vertical transform, and the second transform scheme may apply DST-7 or DST-4 as both horizontal and vertical transform on chroma component. A small block size may be defined as blocks with both height and width being smaller than or equal to a given threshold, e.g., 4, or 8.

According to exemplary embodiments at S14, a horizontal transform selection and signaling may be applied for chroma blocks with width smaller than or equal to a given threshold T4, and in addition or according to other embodiments, a vertical transform selection and signaling may be applied for chroma blocks with height smaller than or equal to a given threshold T4 or other threshold.

According to exemplary embodiments at S14, horizontal transform selection and signaling may be applied for chroma blocks with width smaller than or equal to a first given threshold and the height is smaller than or equal to a second given threshold, and in addition or according to other embodiments, vertical transform selection and signaling may be applied for chroma blocks with height smaller than or equal to a first given threshold and the width is smaller than or equal to a second given threshold. Examples of first threshold value include, but are not limited to: 2, 4, 8, 16. Examples of second threshold value include, but are not limited to: 2, 4, 8, 16, 32, 64.

According to exemplary embodiments at S14, horizontal and/or vertical transform type selection and signaling may be different for different YUV formats.

At S15, if S12 and S13 are "no" or regardless of one or more of S12 and S13, it may be determined whether an intra-inter prediction mode is present, and if so, at S16, a default transform. e.g., DST-7 or DST-4, may always be applied and a transform selection may not be used or signaled.

According to examples at S16, for intra-inter prediction mode, when the block width (or height) is smaller than or equal to a given threshold (namely Thr1), DST-4 may be always used as the horizontal (or vertical) transform, and example threshold values include, but are not limited to, 4, 8, 16, 32, 128.

According to examples at S16, for intra-inter prediction mode, when the block width (or height) is smaller than or equal to a given threshold (namely Thr2), DST-7 may be always used as the horizontal (or vertical) transform, example threshold values include, but are not limited to, 4, 8, 16, 32, 128.

The above example embodiments at S16 may be used jointly, but the thresholds Thr1 and Thr2 may be different. For example, Thr1 may be smaller than Thr2. In one example, for intra-inter prediction mode, when the block width (or height) is smaller than or equal to a given threshold (namely Thr1), DST-4 may be always used as the horizontal (or vertical) transform, and example threshold values include, but are not limited to, 4, 8, 16. In one example, for intra-inter prediction mode, when the block width (or height) is smaller than or equal to Thr2 but larger than Thr1, DST-7 may always be used as the horizontal (or vertical) transform, and example threshold values include, but are not limited to 4, 8, 16, 32, 64, 128

According to exemplary embodiments at S16, whether a default transform type is used or transform type is signaled may be indicated in high-level syntaix element, including but not limited to video parameter set (VPS), sequence parameter set (SPS), picture parameter set (PPS), slice Tile, Tile group or CTU-header, and the high-level syntax element may be a flag indicating whether inter MTS can be used.

At S17, if S12, S13, and S15 are "no" or regardless of one or more of S12, S13, and S15, a 2-point IDT can be used for coding prediction residual. According to exemplary embodiments at S17, the diagonal elements of 2-point IDT transform core is 1, 2, 4, 8, 16, 32, 64, 128, 256, 512, 181, or 91 or 90, and/or the 2-point IDT transform core may be different for different block sizes. According to exemplary embodiments at S17, the 2-point IDT transorm core may be different depending whether log 2(width)+log 2(height) is an even integer number or odd integer number, where log 2( ) is the logarithm operation with basis 2, and width and height indicates the block width and height, respectively.

Accordingly, by exemplary embodiments described herein, the technical problems noted above may be advantageously improved upon by these technical solutions.

The techniques described above, can be implemented as computer software using computer-readable instructions and physically stored in one or more computer-readable media or by a specifically configured one or more hardware processors. For example, FIG. 14 shows a computer system 1400 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
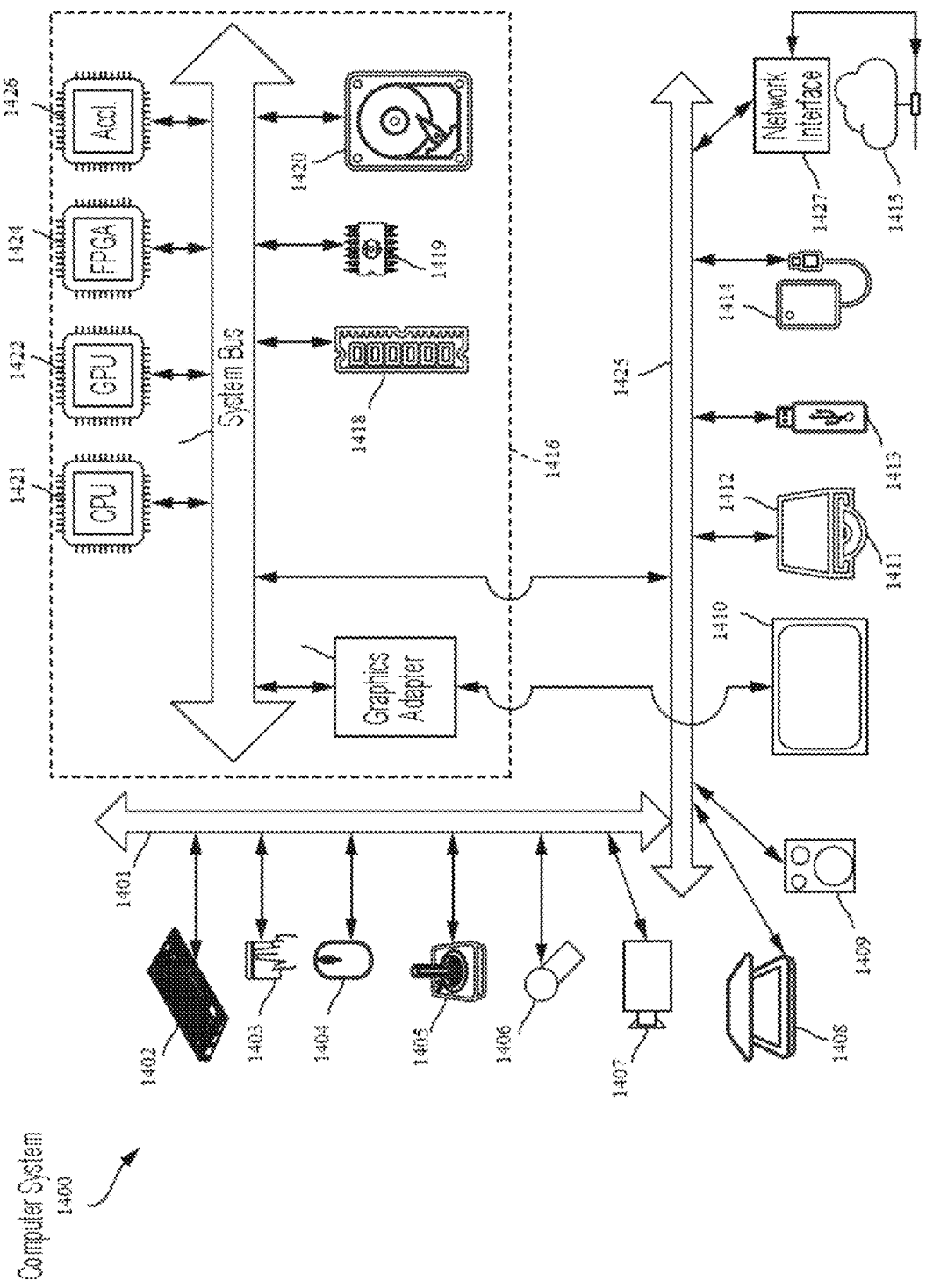
FIG. 14 is a schematic illustration of a diagram in accordance with embodiments.

The components shown in FIG. 14 for computer system 1400 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1400.

Computer system 1400 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1402, mouse 1403, trackpad 1403, touch screen 1404, joystick 1405, microphone 1406, scanner 1408, camera 1407.

Computer system 1400 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1410, or joystick 1405, but there can also be tactile feedback devices that do not serve as input devices), audio output devices (such as: speakers 1409, headphones (not depicted)), visual output devices (such as screens 1410 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1400 can also include human accessible storage devices and their associated media such as optical media including CD/DVD ROM/RW 1412 with CD/DVD or the like media 1411, thumb-drive 1413, removable hard drive or solid state drive 1414, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1400 can also include interface to one or more communication networks 1415. Networks 1415 can for example be wireless, wireline, optical. Networks 1415 can further be local, wide-area, metropolitan, vehicular and industrial, real-time, delay-tolerant, and so on. Examples of networks 1415 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 1427 commonly require external network interface adapters 1427 that attached to certain general-purpose data ports or peripheral buses 1425 (such as, for example USB ports of the computer system 1400; others are commonly integrated into the core of the computer system 1400 by attachment to a system bus as described below (for example Ethernet interface into a PC computer system or cellular network interface into a smartphone computer system). Using any of these networks, computer system 1400 can communicate with other entities. Such communication can be uni-directional, receive only (for example, broadcast TV), uni-directional send-only (for example CANbusto certain CANbus devices), or bi-directional, for example to other computer systems using local or wide area digital networks. Certain protocols and protocol stacks can be used on each of those networks 1415 and network interfaces 1427 as described above.

Aforementioned human interface devices, human-accessible storage devices, and network interfaces 1427 can be attached to a core 1412 of the computer system 1400.

The core 1412 can include one or more Central Processing Units (CPU) 1412, Graphics Processing Units (GPU) 1422, specialized programmable processing units in the form of Field Programmable Gate Areas (FPGA) 1424, hardware accelerators 1426 for certain tasks, and so forth. These devices, along with Read-only memory (ROM) 1419, Random-access memory 1418, internal mass storage such as internal non-user accessible hard drives, SSDs, and the like 447, may be connected through a system bus 1426. In some computer systems, the system bus 1426 can be accessible in the form of one or more physical plugs to enable extensions by additional CPUs, GPU, and the like. The peripheral devices can be attached either directly to the core's system bus 1426, or through a peripheral bus 1401. Architectures for a peripheral bus include PCI, USB, and the like.

CPUs 1421, GPUs 1422, FPGAs 1424, and accelerators 1426 can execute certain instructions that, in combination, can make up the aforementioned computer code. That computer code can be stored in ROM 1419 or RAM 1418. Transitional data can also be stored in RAM 1418, whereas permanent data can be stored for example, in the internal mass storage 1420. Fast storage and retrieve to any of the memory devices can be enabled through the use of cache memory, that can be closely associated with one or more CPU 1421, GPU 1422, mass storage 1420, ROM 1419, RAM 1418, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1400, and specifically the core 1416 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1416 that are of non-transitory nature, such as core-internal mass storage 1420 or ROM 1419. The software implementing various embodiments of the present disclosure can be stored in such devices and executed by core 1416. A computer-readable medium can include one or more memory devices or chips, according to particular needs. The software can cause the core 1416 and specifically the processors therein (including CPU, GPU, FPGA, and the like) to execute particular processes or particular parts of particular processes described herein, including defining data structures stored in RAM 1418 and modifying such data structures according to the processes defined by the software. In addition or as an alternative, the computer system can provide functionality as a result of logic hardwired or otherwise embodied in a circuit (for example: accelerator 1426), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding, the method comprising:
   determining whether at least one parameter of a block is less than or equal to a threshold;
   signaling, in response to determining the at least one parameter of the block is less than or equal to the threshold, one of a horizontal transform and a vertical transform;
   splitting, in response to determining that the at least one parameter of the block is greater than the threshold, the block into sub-blocks;
   applying a first signaling scheme on a luma component and a second signaling scheme on a chroma component;
   performing ones of transforms on the sub-blocks; and
   decoding a video stream by using the sub-blocks upon which the ones of the transforms are performed,
   wherein a maximum block size of the first signaling scheme is different than a maximum block size of the second signaling scheme.

2. The method according to claim 1,
   wherein signaling the at least one of the horizontal transform and the vertical transform is further in response to determining whether at least one signaled transform type selected from multiple candidate transform types is absent symmetry/anti-symmetry characteristics, and
   wherein the at least one signaled transform type is at least one of a discrete cosine transform (DCT)-4, a DCT-5, a DCT-6, a DCT-7, a DCT-8, a discrete sine transform (DST)-4, a DST-5, a DST-6, a DST-7, and a DST-8, and
   wherein a DCT-1, a DCT-2, a DCT-3, a DST-1, a DST-2, and a DST-3 comprise the symmetry/anti-symmetry characteristics.

3. The method according to claim 1, wherein signaling the at least one of the horizontal transform and the vertical transform is further in response to determining whether at least one signaled transform type selected from multiple candidate transform types is other than a recursive transform.

4. The method according to claim 1, wherein signaling the one of the horizontal transform and the vertical transform comprises signaling a vertical transform selection before signaling a horizontal transform selection.

5. The method according to claim 1, wherein the threshold is that the parameter is at least one of a width and a height of the block having an integer less than or equal to 16.

6. The method according to claim 1, wherein splitting the block into the sub-blocks comprises determining different transform types respective to ones of the sub-blocks depending on relative locations of the ones of the sub-blocks with the block.

7. The method according to claim 1, further comprising:
signaling, in response to splitting the block into the sub-blocks, ones of individual transform indices for each of the sub-blocks respectively,
wherein each of the transform indices specify ones of transform selections.

8. The method according to claim 1, further comprising:
signaling, in response to splitting the block into the sub-blocks, a transform index as shared by a plurality of the sub-blocks respectively.

9. The method according to claim 1,
wherein the maximum block size of the second signaling scheme is one of 2, 4, 8, and 16.

10. The method according to claim 1, further comprising:
using a transform selection on a luma component; and
re-using, in response to determining that the luma component shares a block partitioning tree with a chroma component co-located with the luma component, the transform selection of a luma component on the chroma component.

11. An apparatus comprising:
at least one memory configured to store computer program code;
at least one hardware processor configured to access the computer program code and operate as instructed by the computer program code, the computer program code including:
determining code configured to cause the processor to determine whether at least one parameter of a block is less than or equal to a threshold;
signaling code configured to cause the processor to signal, in response to determining the at least one parameter of the block is less than or equal to the threshold, one of a horizontal transform and a vertical transform;
splitting code configured to cause the processor to split, in response to determining that the at least one parameter of the block is greater than the threshold, the block into sub-blocks;
applying code configured to cause the processor to apply a first signaling scheme on a luma component and a second signaling scheme on a chroma component;
transform code configured to cause the processor to perform ones of transforms on the sub-blocks; and
decoding code configured to cause the processor to perform decoding of a video stream by using the sub-blocks upon which the ones of the transforms are performed,
wherein a maximum block size of the first signaling scheme is different than a maximum block size of the second signaling scheme.

12. The apparatus according to claim 11,
wherein signaling code is further configured to cause the processor to signal the at least one of the horizontal transform and the vertical transform in further response to determining whether at least one signaled transform type selected from multiple candidate transform types is absent symmetry/anti-symmetry characteristics, and
wherein the at least one signaled transform type is at least one of a discrete cosine transform (DCT)-4, a DCT-5, a DCT-6, a DCT-7, a DCT-8, a discrete sine transform (DST)-4, a DST-5, a DST-6, a DST-7, and a DST-8, and
wherein a DCT-1, a DCT-2, a DCT-3, a DST-1, a DST-2, and a DST-3 comprise the symmetry/anti-symmetry characteristics.

13. The apparatus according to claim 11, wherein the signaling code is further configured to cause the processor to signal the at least one of the horizontal transform and the vertical transform is in further response to determining whether at least one signaled transform type selected from multiple candidate transform types is other than a recursive transform.

14. The apparatus according to claim 11, wherein signaling code is further configured to cause the processor to signal the one of the horizontal transform and the vertical transform comprises signaling a vertical transform selection before signaling a horizontal transform selection.

15. The apparatus according to claim 11, wherein the threshold is that the parameter is at least one of a width and a height of the block having an integer less than or equal to 16.

16. The apparatus according to claim 11, wherein splitting code is further configured to cause the processor to split the block into the sub-blocks and determine different transform types respective to ones of the sub-blocks depending on relative locations of the ones of the sub-blocks with the block.

17. The apparatus according to claim 11, wherein the signaling code is further configured to cause the processor to signal, in response to splitting the block into the sub-blocks, ones of individual transform indices for each of the sub-blocks respectively,
wherein each of the transform indices specify ones of transform selections.

18. The apparatus according to claim 11, wherein the signaling code is further configured to cause the processor to signal, in response to splitting the block into the sub-blocks, a transform index as shared by a plurality of the sub-blocks respectively.

19. The apparatus according to claim 11, further comprising:
using code configured to cause the processor to use a transform selection on a luma component; and
re-using code configured to cause the processor to re-use, in response to determining that the luma component shares a block partitioning tree with a chroma component co-located with the luma component, the transform selection of a luma component on the chroma component.

20. A non-transitory computer readable medium storing a program causing a computer to execute a process, the process comprising:
determining whether at least one parameter of a block is less than or equal to a threshold;

signaling, in response to determining the at least one parameter of the block is less than or equal to the threshold, one of a horizontal transform and a vertical transform;

splitting, in response to determining that the at least one parameter of the block is greater than the threshold, the block into sub-blocks;

applying a first signaling scheme on a luma component and a second signaling scheme on a chroma component;

performing ones of transforms on the sub-blocks; and decoding a video stream by using the sub-blocks upon which the ones of the transforms are performed, wherein a maximum block size of the first signaling scheme is different than a maximum block size of the second signaling scheme.

* * * * *